United States Patent
Hattori

(10) Patent No.: US 9,208,419 B2
(45) Date of Patent: Dec. 8, 2015

(54) CONTROLLING APPARATUS FOR CONTROLLING A FIRST PRINTING APPARATUS AND A SECOND APPARATUS

(71) Applicant: CANON KABUSHIKI KAISHA, Tokyo (JP)

(72) Inventor: Yuna Hattori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/553,087

(22) Filed: Nov. 25, 2014

(65) Prior Publication Data

US 2015/0170011 A1   Jun. 18, 2015

(30) Foreign Application Priority Data

Dec. 12, 2013   (JP) .................. 2013-257393

(51) Int. Cl.
  *G06K 15/00* (2006.01)
  *G06K 15/02* (2006.01)
  *G06F 3/12* (2006.01)

(52) U.S. Cl.
  CPC .............. *G06K 15/408* (2013.01); *G06F 3/121* (2013.01); *G06F 3/1259* (2013.01); *G06F 3/1293* (2013.01); *G06K 15/022* (2013.01)

(58) Field of Classification Search
  CPC ........................... G06K 15/408; G06K 15/022
  USPC ......................................................... 358/488
  See application file for complete search history.

(56) References Cited

U.S. PATENT DOCUMENTS 6,567,621 B2    5/2003  Miyoshi et al.
2003/0151764 A1*  8/2003  Uchida .................. 358/1.14

FOREIGN PATENT DOCUMENTS

JP        2003-39750 A    2/2003

* cited by examiner

*Primary Examiner* — Marcellus Augustin
(74) *Attorney, Agent, or Firm* — Fitzpatrick, Cella, Harper & Scinto

(57) ABSTRACT

A controlling apparatus, which controls a first printing apparatus that prints an image on a continuous sheet and a second printing apparatus that prints on the continuous sheet on a downstream side in a conveyance direction of the continuous sheet, stores a printing state of the first printing apparatus and a second printing apparatus. When an error is detected in the first printing apparatus, conveyance of the continuous sheet is suspended, and occurrence position of the error is specified. When it is detected that the error is solved, and conveyance of the continuous sheet is restarted, control is performed such that the second printing apparatus performs printing on the continuous sheet on which printing has been finished by the first printing apparatus before the detection of the error, based on the specified occurrence position of the error.

24 Claims, 15 Drawing Sheets

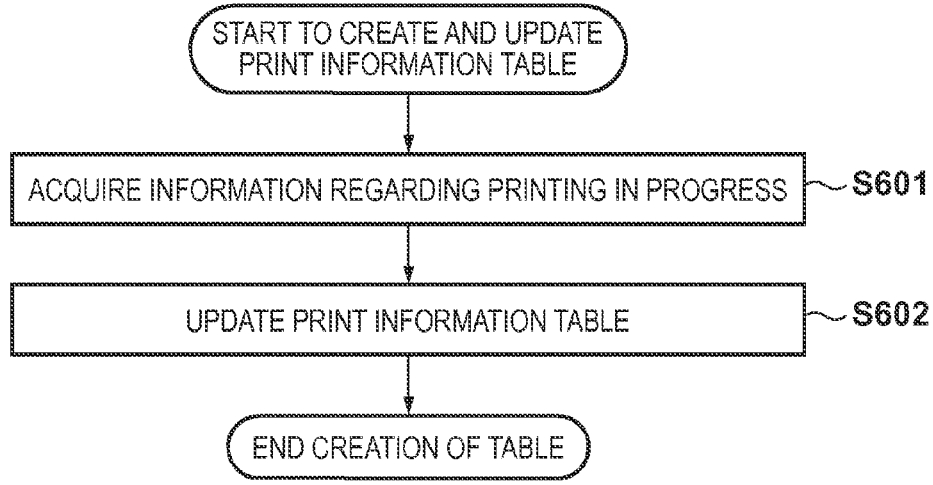
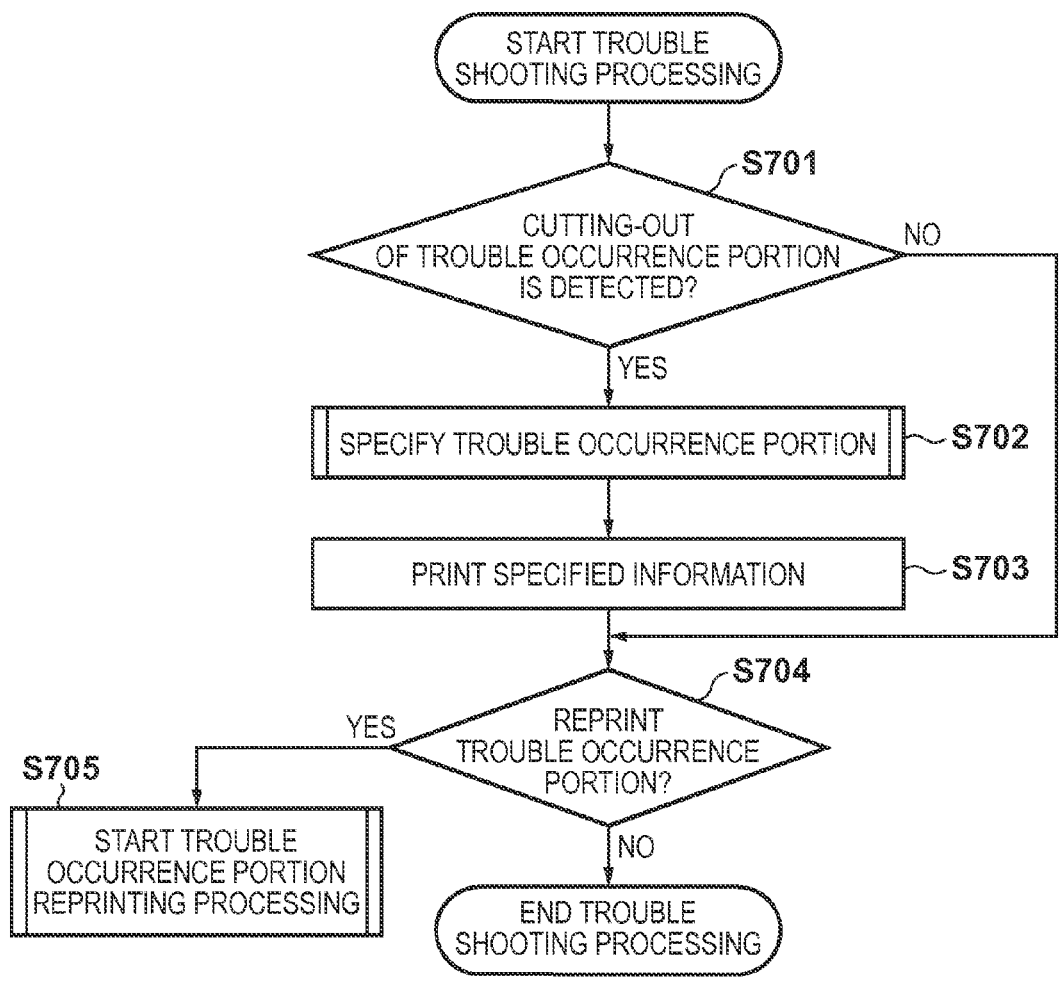

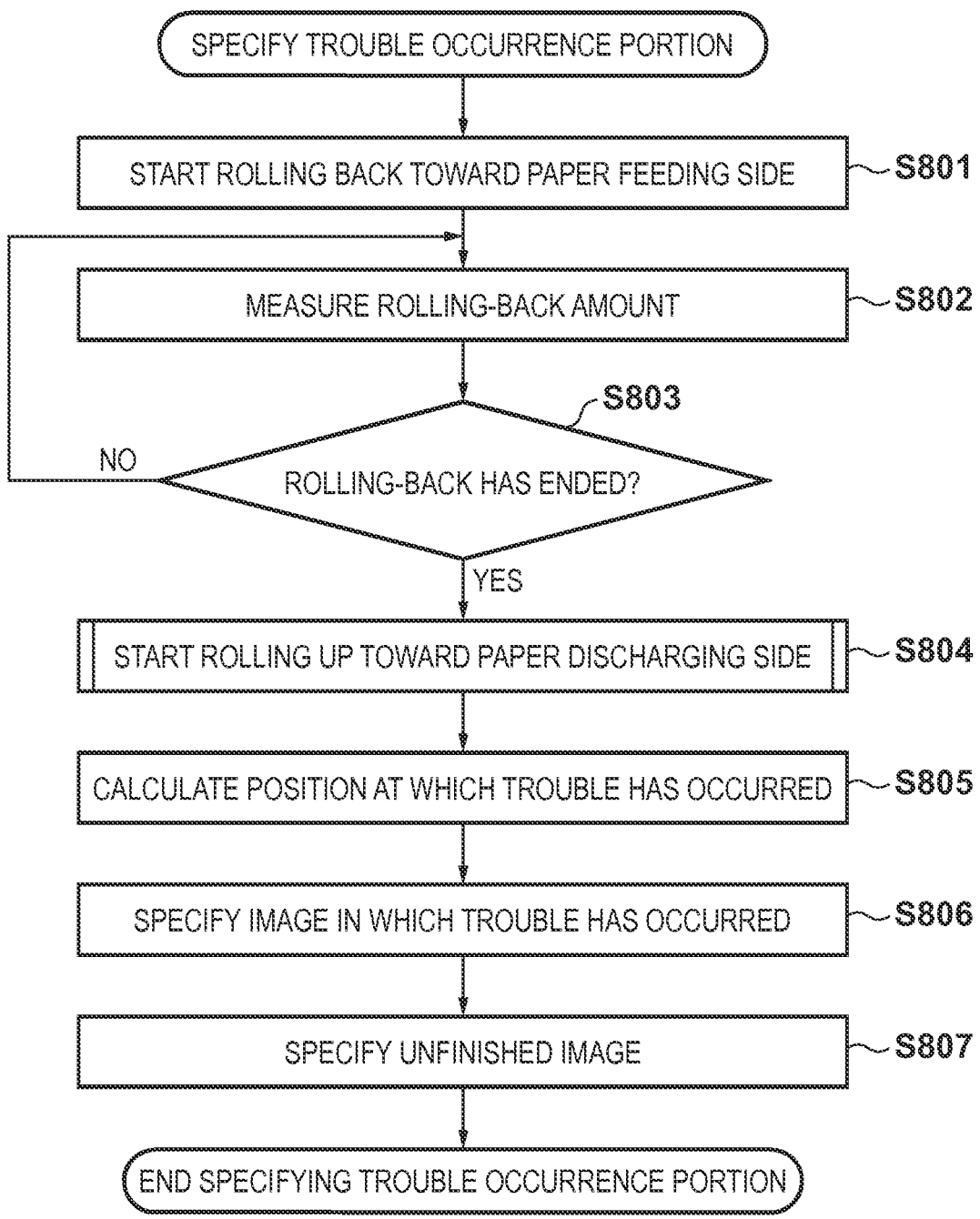

FIG. 13

| IMAGE TYPE OR BLANK | BLANK AND IMAGE SPECIFICATION INFORMATION | CONFIGURATION ORDER | LENGTH | ACCUMULATED LENGTH | PRINT START | PRINT END |
|---|---|---|---|---|---|---|
| BLANK | PAPER FEED BLANK 1 | 1 | 20 | 20 | - | - |
| PRELIMINARY DISCHARGE | PRELIMINARY DISCHARGE 1 | 2 | 20 | 40 | 1 | 1 |
| IMAGE | IMAGE 1 | 3 | 200 | 240 | 1 | 1 |
| CUT MARK | CUT MARK 1 | 4 | 10 | 250 | 1 | 1 |
| IMAGE | IMAGE 2 | 5 | 200 | 450 | 1 | 1 |
| CUT MARK | CUT MARK 2 | 6 | 10 | 460 | 1 | 1 |
| BLANK | PAPER FEED BLANK 2 | 7 | 5 | 465 | - | - |
| PRELIMINARY DISCHARGE | PRELIMINARY DISCHARGE 2 | 8 | 20 | 485 | 1 | 0 |

1301　1302　1303　1304　1305　1306　1307

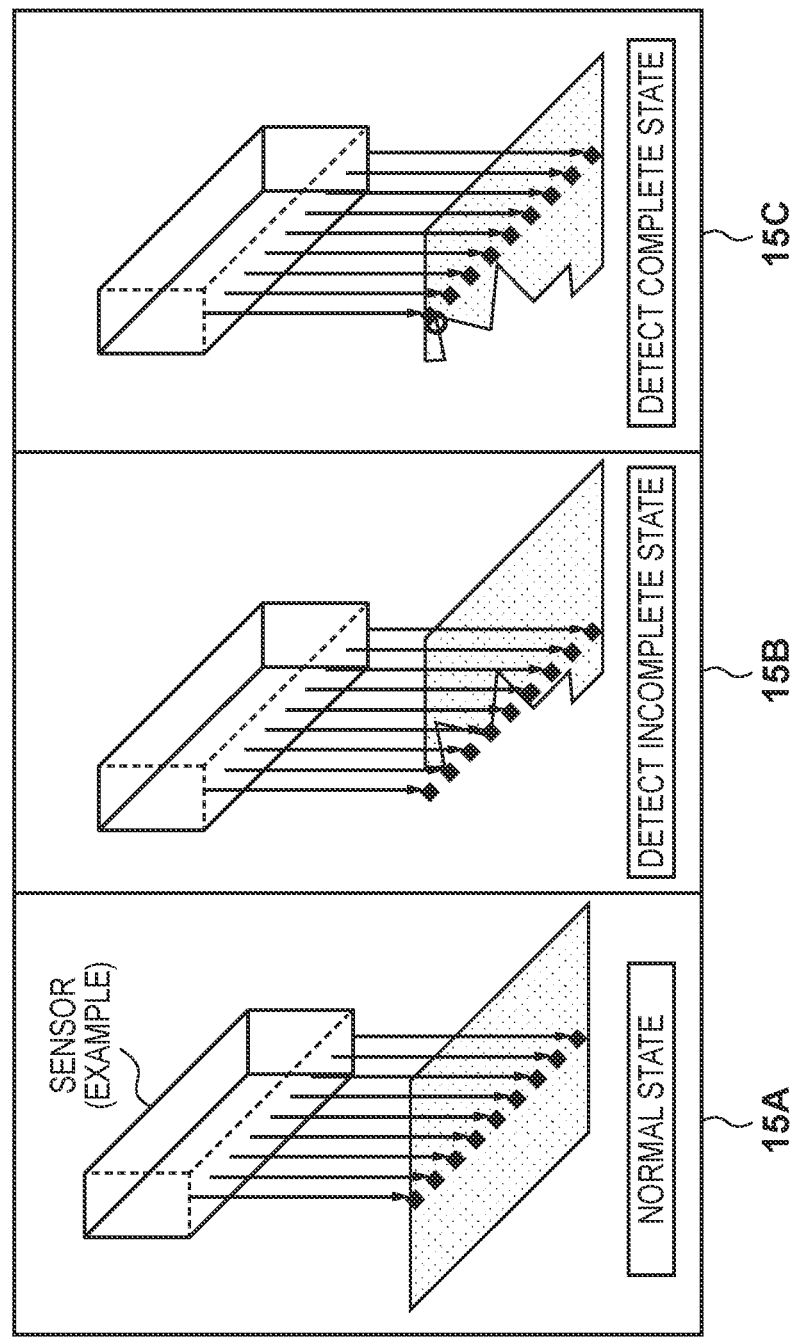

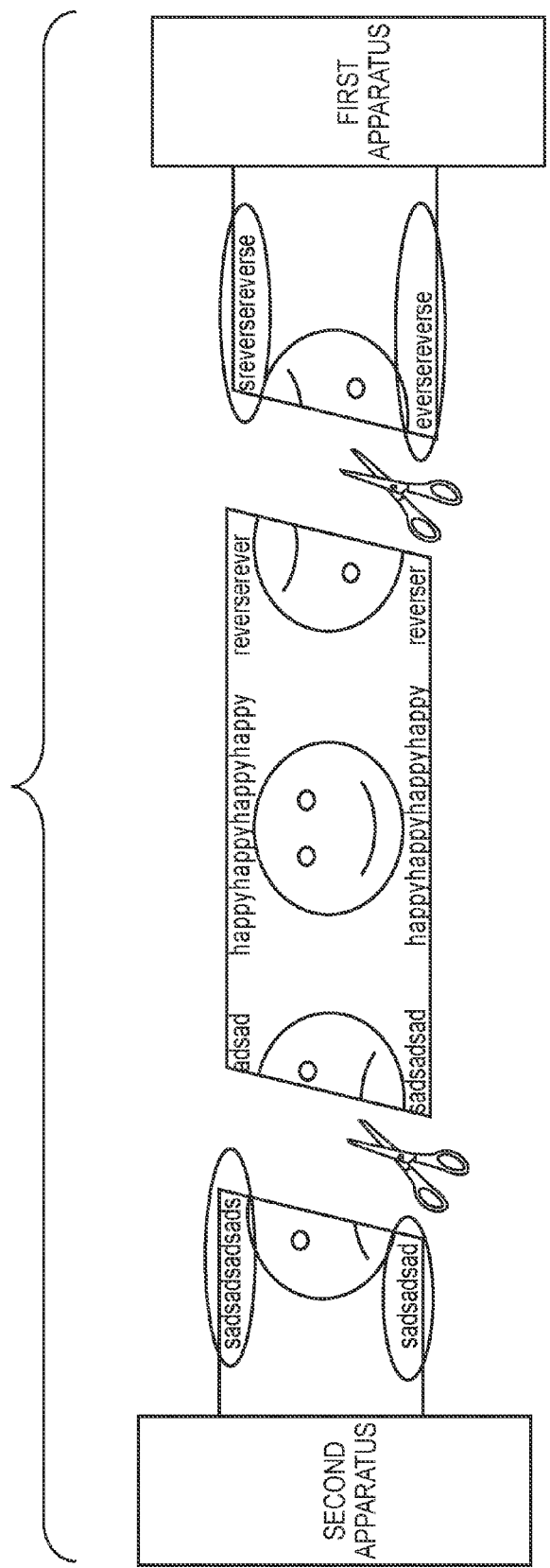

CONTROLLING APPARATUS FOR CONTROLLING A FIRST PRINTING APPARATUS AND A SECOND APPARATUS

BACKGROUND OF THE INVENTION

1. Field of the Invention

The present invention relates to a controlling apparatus and a control method for controlling a printing apparatus, and a storage medium storing a program.

2. Description of the Related Art

In a printing system in which printing is performed using, as a printing medium, a continuous sheet such as rolled paper, there are cases where printing is suspended due to occurrence of some kind of trouble in the middle of printing. At this time, a measure is necessary for not treating, as a finished product (printed matter), a printing medium affected by the trouble (staining or breakage). For this purpose, a configuration is provided in which the printing medium affected by a trouble is cut out, in some cases.

In a case where printing is resumed after cutting out the printing medium due to a trouble, there are cases where printing is continued on the printing medium remaining in the printing system. However, in this case, printing that has been performed before the printing is suspended cannot be continued as-is, due to the influence of suspended printing and cutting of the printing medium resulting from the trouble. For this reason, it is necessary to specify the image with which printing is to be restarted, or the position on the printing medium from which printing is to be restarted, while considering the influence of the suspended printing and the cutting of the printing medium resulting from the trouble.

Japanese Patent Laid-Open No. 2003-039750 describes a tandem printing system in which one side of paper is printed by a first printing apparatus and the back face is printed by a second printing apparatus. Japanese Patent Laid-Open No. 2003-039750 recites that, in a case where a jam occurs in the second apparatus, the start page of the back face to be printed by the second apparatus after the occurrence of the jam is specified, in order not to waste the sides that have been printed by the first apparatus. It is also recited that a page identification mark is printed on the printing medium, and the page from which printing is restarted after cutting out the printing medium is specified by detecting the mark.

However, with the method of printing the identification mark in Japanese Patent Laid-Open No. 2003-039750, the printing restart page in the second apparatus cannot be specified if the identification mark cannot be correctly read due to erroneous detection or the like. Furthermore, if the position where the user cuts out the printing medium overlaps an image as shown in FIG. 16 and a sensor detects the identification mark of the image that was cut halfway, it may possibly be determined in error that this image is complete.

SUMMARY OF THE INVENTION

An aspect of the present invention is to eliminate the above-mentioned problems with the conventional technology. The present invention provides a controlling apparatus, a control method, and a program with which printing can be appropriately restarted even if an error has occurred.

The present invention in one aspect provides a controlling apparatus for controlling a first printing apparatus that prints an image on a continuous sheet and a second printing apparatus that prints on the continuous sheet that is printed by the first printing apparatus on a downstream side in a conveyance direction of the continuous sheet, the controlling apparatus comprising: an updating unit configured to update, while printing on the continuous sheet, printing information containing execution information with which a printing state on the continuous sheet in the first printing apparatus and the second printing apparatus can be specified; a determination unit configured to determine whether an error has occurred in the first printing apparatus; a specification unit configured to specify, in a case where it is determined by the determination unit that an error has occurred in the first printing apparatus, an occurrence position of the error on the continuous sheet, based on the printing information updated by the updating unit; and a control unit configured to perform control such that the second printing apparatus performs printing on the continuous sheet on which printing has been finished by the first printing apparatus before it is determined by the determination unit that an error has occurred, based on the occurrence position of the error specified by the specification unit.

According to the present invention, printing can be appropriately restarted even if an error has occurred.

Further features of the present invention will become apparent from the following description of exemplary embodiments with reference to the attached drawings.

BRIEF DESCRIPTION OF THE DRAWINGS

FIG. 6 is a diagram showing procedure of processing in step S504 in FIG. 5.

FIG. 7 is a diagram showing procedure of processing in step S509 in FIG. 5.

FIG. 8 is a diagram showing procedure of processing in step S702 in FIG. 7.

FIG. 13 is a diagram showing an exemplary printing information table.

FIG. 15 is a diagram illustrating processing start positions.

FIG. 16 is a diagram showing cutting of troubled portions in a tandem printing system.

DESCRIPTION OF THE EMBODIMENTS

Figure 1:
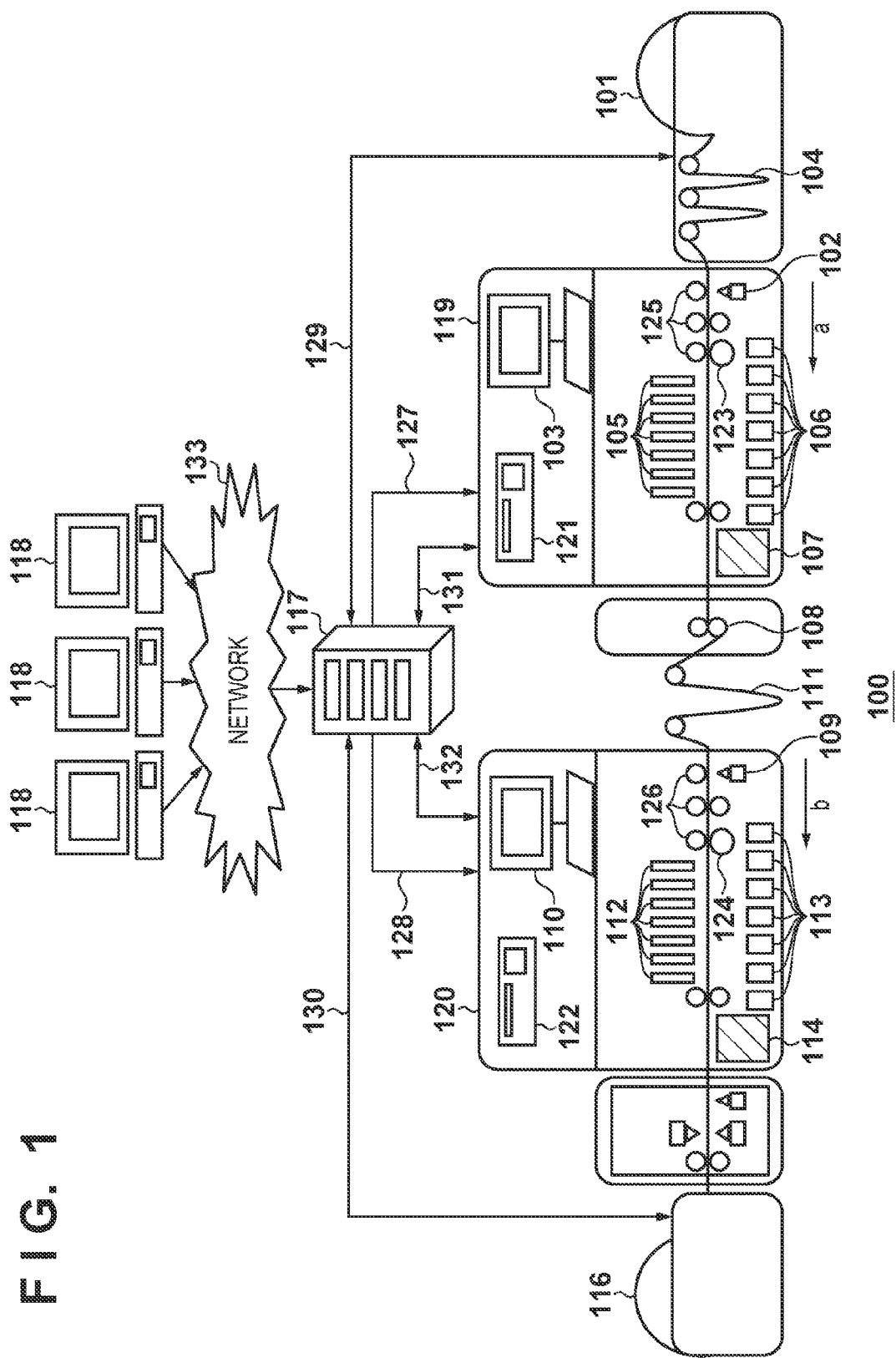
FIG. 1 is a diagram showing a configuration of a printing system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals will be given to the same constituent elements, and a repetitive description thereof will be omitted.

First Embodiment

FIG. 1 is a diagram showing a schematic configuration of a tandem printing system (hereinafter, "printing system"). FIG. 1 is a diagram showing an overall configuration of the printing system using a rolled sheet (a printing medium that is continuous and longer in the conveyance direction than the length of a print unit (one page), a continuous sheet) as a printing medium.

A printing system 100 includes a first printing apparatus 119 located on the upstream side in the conveyance direction of the continuous sheet, and a second printing apparatus 120 located on the downstream side in the conveyance direction. The printing system 100 also includes a controller 117 and host computers 118. The aforementioned first printing apparatus 119, second printing apparatus 120, and host computers 118 are connected to the controller 117. Furthermore, the printing system 100 includes a paper feed unit 101 that supplies the continuous sheet to the first printing apparatus 110, a sheet inversion unit 108 provided between the first printing apparatus 119 and the second printing apparatus 120, a scanner unit 115, and a rolling unit 116.

The paper feed unit 101 supplies the rolled sheet (hereinafter referred to also as a sheet), which is the continuous sheet, to the first printing apparatus 119, and the rolling unit 116 rolls up the sheet on which printing has finished from the second printing apparatus 120. The sheet inversion unit 108 inverts front and back faces of the sheet that is output from the first printing apparatus 119. The scanner unit 115 optically reads an image that has finished being printed by the second printing apparatus 120, and checks the content of the image. The controller 117 controls the first printing apparatus 119 and the second printing apparatus 120, and performs RIP processing on print data. The print data is, for example, data of a print target image.

The host computers 118 each transmit a print job to the controller 117 via a network 133. The host computers 118 each select an image to be printed, configure settings of print size, layout, and the like, and create a print job. Although host computers connected to the network 133 are shown as the host computers 118 in FIG. 1, the present invention is not limited thereto, and host computers that are directly connected to the controller 117 may also be employed as the host computers 118. Although the controller 117 acquires a print job from the host computers 118, the present invention is not limited thereto, and for example, the controller 117 may acquire a print job from a portable media such as a USB memory. The host computers 118 each acquire progress of the transmitted print job, from the controller 117, the first printing apparatus 119, and the second printing apparatus 120, and manage it.

The controller 117 receives a print job from the host computers 118, and performs the RIP processing on print data corresponding to the print job. Then, the controller 117 transmits the print data to the first printing apparatus 119 and the second printing apparatus 120 via data communication interfaces (IFs) 127 and 128. The data communication IFs 127 and 128 are constituted by interfaces capable of high-speed data transmission and reception, such as optical fibers, and can transmit a large volume of print data from the controller 117 to the first printing apparatus 119 and the second printing apparatus 120. Note that, although reception of a print job from the host computers 118 and the RIP processing are performed by a single device, namely the controller 117, reception of a print job may be performed by another computer, or the RIP processing may be performed by another computer. Alternatively, as in a server configuration, processing may be divided such that print job reception and the RIP processing are performed by respective internal blades. As described above, the configuration of the host computers 118, the network 133, and the controller 117 is not limited to the mode shown in FIG. 1.

The controller 117 also transmits a control command to the first printing apparatus 119, the second printing apparatus 120, the paper feed unit 101, and the rolling unit 116 via control communication IFs 129, 130, 131, and 132 and controls these apparatuses. The controller 117 also transmits print job information and various setting data necessary for printing and control to the first printing apparatus 119 and the second printing apparatus 120 via the control communication IFs 131 and 132. The controller 117 also acquires the state of each printing apparatus and progress information regarding whether printing for a print job is being performed or has finished, and the like, from the first printing apparatus 119 and the second printing apparatus 120.

The first printing apparatus 119 receives print data that has undergone the RIP processing, from the controller 117 via the data communication IF 127. The first printing apparatus 119 includes a reading sensor 102 that reads various marks printed on the sheet, printing heads 105 corresponding to respective colors, and ink tanks 106 that supply ink to the printing heads 105 and correspond to respective colors. The first printing apparatus 119 also includes a drying unit 107 that dries ink of an image printed on the sheet, and an operation unit 103. The operation unit 103 is a unit with which a user performs various instruction operations and that notifies the user of various kinds of information. For example, the user can check a printing state, such as whether an image is being printed or has finished being printed, for each order. The user can also check various states of the apparatuses such as the amount of remaining ink and the amount of remaining sheet, input an adjust value for printing head positions and a registration adjustment value, and give an instruction to execute apparatus maintenance such as an operation for recovering the printing heads. The first printing apparatus 119 includes a control unit 121, an encoder 123 that controls the amount of conveyance and a conveyance state of the printing medium, and a conveyance roller 125. The control unit 121 contains a control unit including a controller (CPU or MPU), various I/O interfaces, and an apparatus (apparatus that generates display information, audio information, etc.) that outputs information of user interfaces, and comprehensively controls the overall first printing apparatus 119. The configuration of the first printing apparatus 119 is not limited thereto, and for example, a unit, a sensor, and the like may be added thereto as necessary.

The second printing apparatus 120 receives the print data from the controller 117 via the data communication IF 128. The second printing apparatus 120 includes a reading sensor 109 that reads various marks printed on the sheet, printing heads 112 corresponding to respective colors, and ink tanks 113 that supply ink to the printing heads 112 and correspond to respective colors. The second printing apparatus 120 also includes a drying unit 114 that dries ink of an image printed on the sheet, and an operation unit 110. The operation unit 110 is a unit with which the user performs various instruction operations and that notifies the user of various kinds of information. For example, the user can check a printing state, such as whether an image is being printed or has finished being printed, for each order. The user can also check various states of the apparatuses such as the amount of remaining ink and the amount of remaining sheet, input an adjust value for printing head positions and a registration adjustment value, and give an instruction to execute apparatus maintenance such as an operation for recovering the printing heads. The second printing apparatus 120 includes a control unit 122, an encoder 124 that controls the amount of conveyance and a conveyance state of the printing medium, and a conveyance roller 126. The control unit 122 contains a control unit including a controller (CPU or MPU), various I/O interfaces, and an apparatus (apparatus that generates display information, audio information, etc.) that outputs information of user interfaces, and comprehensively controls the overall second printing apparatus 120. The configuration of the second printing apparatus 120 is not limited thereto, and for example, a unit, a sensor, and the like may be added thereto as necessary. Although the first printing apparatus 119 and the second printing apparatus 120 have the same configuration in the present embodiment, they may have different configurations such that, for example, a control board for controlling the paper feed unit 101 is installed only in the first printing apparatus 119.

The paper feed unit 101 performs control for conveying the sheet to the first printing apparatus 119. The user attaches the sheet to a control bar within the paper feed unit, and thereafter loads the sheet onto the body of the paper feed unit 101. The paper feed unit 101 receives an instruction to start paper feed, from the controller 117 via the control communication IF 129, and starts to convey the sheet (printing medium). A loop control unit 104 for absorbing an error in the conveyance speed adjusts the paper conveyance speed. Although the loop control unit is provided in the paper feed unit 101 in FIG. 1, the present invention is not limited thereto, and for example, the loop control unit 104 that absorbs the conveyance speed may be provided within the first printing apparatus 119. The sheet withdrawn from the paper feed unit 101 is conveyed in the direction of arrow a, and reaches the first printing apparatus 119. The paper feed unit 101 may include a configuration in which cut paper or a continuous sheet that is not in a rolled form is fed.

The first printing apparatus 119 prints an image in accordance with the print data received from the controller 117. Each of the printing heads 105 for multiple colors is independent and is held in the sheet conveyance direction. In the present embodiment, the printing heads 105 are line-type printing heads corresponding to seven colors, namely C (cyan), M (magenta), Y (yellow), LC (light cyan), LM (light magenta), G (gray), and K (black). Note that the printing heads 105 may also correspond to colors other than these colors, or do not have to correspond to all of these colors. The first printing apparatus 119 causes ink to be discharged from the printing heads 105 and forms an image on the sheet in synchronization with conveyance of the sheet (printing medium). Note that the printing heads 105 are arranged at positions at which destinations of discharged ink do not overlap the conveyance roller 125. Although the present embodiment employs a configuration in which ink is directly discharged to the sheet, an alternative configuration may be employed in which ink is attached to an intermediate transfer member and this ink is thereafter attached to the sheet to thereby form an image.

The ink tanks 106 independently store ink of the respective colors. The ink is supplied by tubes from the ink tanks 106 to sub-tanks (not shown) provided so as to correspond to the respective colors, and the ink is supplied via tubes from the sub-tanks to the respective printing heads 105. The printing heads 105 for the respective colors are arranged in parallel so as to be aligned with direction a, which is the conveyance direction at the time of printing. The line-type printing heads for the respective colors may be seamlessly constituted by a single nozzle chip, or may be divided nozzle chips that are arranged in a line or regularly arranged as in a staggered arrangement. In the present embodiment, the printings heads 105 are so-called full line-type multi-printing heads in which nozzles are arranged in a range that covers the width of the printable area of a maximum-size sheet which can be used in the first printing apparatus 119.

As an inkjet printing method in which ink is discharged from nozzles, a method using a heat-generating element, a method using a piezo element, a method using an electrostatic element, a method using a MEMS element, or the like may be employed. Ink is discharged from the nozzle of each printing head 105 based on the print data, and the discharging timing is determined by an output signal of the conveyance encoder 123. Note that, although an inkjet printing apparatus using ink as a printing agent is used in the present embodiment, the present invention is not limited thereto. Printers of various printing methods, such as electrophotographic printing methods including a thermal printer (sublimation type, thermal transfer type, etc.), a dot impact printer, an LED printer, and a laser printer, may be used.

After an image is formed on the sheet, the sheet is conveyed to the drying unit 107. The drying unit 107 heats the sheet passing through the inside of the unit with warm air (warmed gas (air)) in order to dry the sheet to which the ink is attached, in a short time. Note that, in place of using warm air, various drying methods may be employed such as drying with cool air, warming with a heater, air drying only by causing the sheet to wait, and drying with irradiation of electromagnetic waves such as ultraviolet light. After the drying of the image printed on the sheet finishes, the sheet is conveyed to the sheet inversion unit 108. The sheet inversion unit 108 inverts the sheet in order to print on the back face of the face (first face) that has been printed by the first printing apparatus 119. The inverted sheet reaches the second printing apparatus 120 via a loop control unit 111 that absorbs an error in the conveyance speed. Here, although the loop control unit is provided downstream of the sheet inversion unit 108, the loop control unit 111 that absorbs the conveyance speed may be provided within the second printing apparatus 120. Note that the sheet inversion unit 108 is detachable. For example, a configuration may be employed in which, when performing one-sided printing, the sheet inversion unit 108 is detached and the first face is printed by both the first printing apparatus 119 and the second printing apparatus 120.

The second printing apparatus 120 prints an image in accordance with the print data received from the controller 117. Initially, the reading sensor 109 detects a printed position on the first face, reads a mark printed for image identification regarding what kind of image is printed on the first face, and defines the image to be printed on the second face corresponding to the first face and determines the position where the image starts to be printed on the second face. The image to be printed on the second face and the print timing are determined in accordance with the result of the reading by the reading sensor 109. The printing heads 112, the ink tanks 113, and the drying unit 114 have configurations similar to the printing heads 105, the ink tanks 106, and the drying unit 107 in the first printing apparatus 119, respectively. The conveyance encoder 124 and the conveyance roller 126 have configurations similar to the conveyance encoder 123 and the conveyance roller 125 in the first printing apparatus 119, respectively.

After the drying of the image printed on the sheet finishes, the sheet is conveyed to the scanner unit 115. In the scanner unit 115, two scanner sensors are arranged so as to face each other such that both faces of the sheet can be simultaneously read, and simultaneously optically reads images printed on both faces of the sheet and checks the image content. For example, the scanner unit 115 optically reads the printed images and special patterns on the sheet to check whether the printed image has any problem and check the state of the printing apparatuses such as an ink discharging state. When checking the images, a predetermined pattern for checking the state of the printing heads may be read to check the ink discharging state, or it may be checked whether or not printing is successful, by means of comparison with original images. Furthermore, a user may be able to select a checking method from among various methods as appropriate on the user interface. If it is determined during the checking of the state of images and the apparatuses that the state is not good, the corresponding image may be punched or attached with a mark such that it can be identified which image is not in a good state.

Although two scanner sensors are installed on the downstream side of the second printing apparatus 120 to simultaneously read both faces in the present embodiment, the present invention is not limited thereto. For example, a configuration may be employed in which the first scanner is arranged immediately after the first printing apparatus 119 to scan an image printed on the first face and check the image, and the second scanner is arranged after the second printing apparatus 120 to scan an image printed on the second face and check the image. Although reading is performed by the scanner, reading may be performed by an apparatus using an area sensor, such as a camera.

After the scanning of the sheet finishes, the sheet is conveyed to the rolling unit 116. The rolling unit 116 performs control for rolling up the printed sheet discharged from the second printing apparatus 120. The rolling unit 116 starts the rolling operation after receiving a rolling instruction from the controller 117 via the control communication IF 130, and rolls up the sheet with both faces printed.

Note that the printing system shown in FIG. 1 is capable of both one-sided printing and two-sided printing. In the case of one-sided printing, printing may be performed by the first printing apparatus 119, or may be performed by the second printing apparatus 120. Furthermore, the first printing apparatus 119 and the second printing apparatus 120 may have different roles in printing by job, printing by page, or printing by image in each page. In the case of two-sided printing, the first printing apparatus 119 may print on the first face and the second printing apparatus 120 may print on the second face, or the first printing apparatus 119 may print on the second face and the second printing apparatus 120 may print on the first face.

Although a printing system constituted by two printing apparatuses has been described, the present invention is not limited thereto. Three or more printing apparatuses may be connected in series, or a configuration may be employed in which multiple sets of two printing apparatuses connected in series are configured in parallel and controlled by a single controller 117. Although FIG. 1 shows a printing system that have only a print function, the present invention is not limited thereto, and the printing system may be one that further includes a reading apparatus for reading an image on an original and functions as a copying machine, or a printing system serving as a multifunction printer (MFP) that also has other additional functions. Although a rolled sheet is used as the printing medium (printing medium or sheet) on which printing processing is performed in the above description, the printing medium is not limited to a rolled printing medium, and may be any kinds of elongated printing medium with which printing for several pages can be continuously performed on the same face without a suspension in the middle. Cutting of the printing medium may be automatically performed by the printing apparatuses, or may be performed by the user giving a manual instruction, or cutting processing may be performed in a post-process. The material of the printing medium is not limited to paper, and various materials may be used with which printing processing can be performed. Each printing apparatus may be a printing apparatus that can print not only on the printing medium but also a cut sheet that is cut into a predetermined size in advance.

The printing method is not limited to image printing by means of the inkjet printing method using later-described liquid ink for image printing. Solid ink may be used as a printing agent, or various printing methods such as an electrophotographic method using toner or a sublimation method may be employed. Furthermore, the printing method is not limited to a color printing method using printing agents of multiple colors, and may be a monochrome printing method using only black (including gray). Printing is not limited to printing of visible images, and may be printing of invisible images or images that is difficult to see (watermark image etc.). Furthermore, various types of print target other than a general image may be printed, e.g., a wiring pattern, a physical pattern in manufacturing of parts, a DNA sequence, or the like may be printed. That is to say, the present invention is applicable to various types of printing apparatus (printing apparatus) as long as a printing agent can be attached to a printing medium. In the case of controlling the printing processing of the printing apparatuses in accordance with an instruction from a connected external apparatus separate from the printing system in FIG. 1, this external apparatus will serve as a print controlling apparatus. Although not shown in FIG. 1, the first printing apparatus 119 and the second printing apparatus 120 each include at least one paper end detection sensor for detecting a cut line of the sheet.

Figure 2:
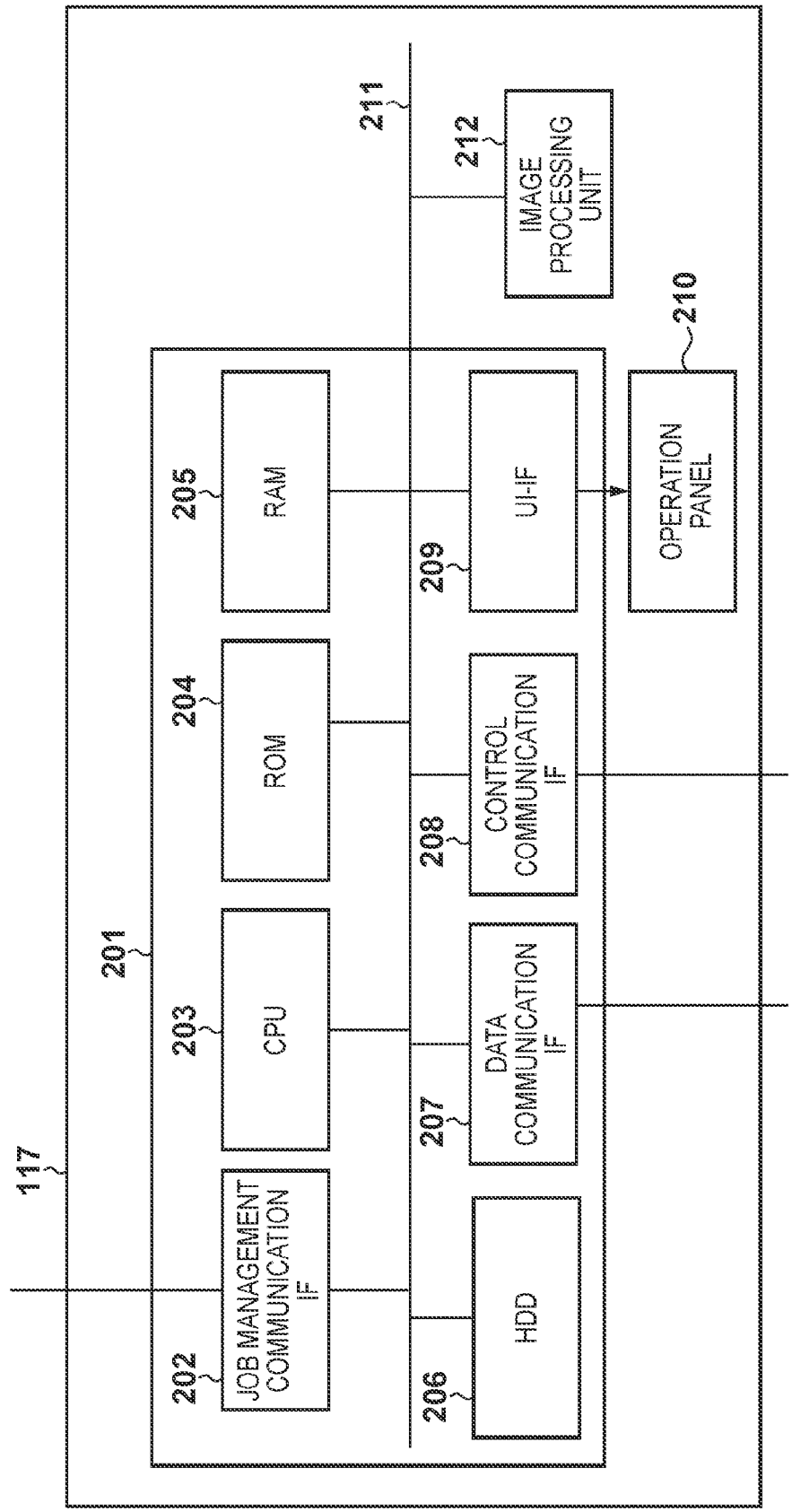
FIG. 2 is a block diagram showing a configuration of a controller.

FIG. 2 is a block diagram showing a configuration of the controller 117. In FIG. 2, the controller 117 includes a main control unit 201 and an image processing unit 212. These are connected to a system bus 211. The main control unit 201 is a primary control unit of the controller 117. The main control unit 201 generates print data at the image processing unit 212, based on print job supplied from the host computers 118. Furthermore, the main control unit 201 controls printing in the first printing apparatus 119 and the second printing apparatus 120 with which the main control unit 201 can communicate via a control communication IF 208 and a data communication IF 207. The main control unit 201 includes a job management communication IF 202, a CPU 203, a ROM 204, a RAM 205, a HDD 206, a data communication IF 207, the control communication IF 208, and a user interface (UI) IF 209. These are connected to the system bus 211. The image processing unit 212 includes a CPU, a ROM, and a RAM, similarly to the main control unit 201, and can operate in cooperation with the main control unit 201.

The job management communication IF 202 transmits and receives a print job and other commands that are supplied from the host computers 118, a status signal, and the like. The CPU 203 performs various calculations, and comprehensively controls the overall controller 117. The ROM 204 stores fixed data and various control programs to be executed by the CPU 203. The RAM 205 is used as a work area for the CPU 203 when performing various calculations and control. The HDD 206 is an area for temporarily storing print job supplied from the host computers 118, necessary tables, print data obtained from the image processing unit 212, and the like. The data communication IF 207 is an interface for transmitting the print data stored in the HDD 206 to the first printing apparatus 119 and the second printing apparatus 120. The control communication IF 208 is an interface for transmitting and receiving a control command, a status signal, and the like between the first printing apparatus 119 and the second printing apparatus 120. The UI-IF 209 is an interface for transmitting and receiving a command and the like to/from an operation panel 210.

The operation panel 210 is an input apparatus with which the user operates the first printing apparatus 119 and the second printing apparatus 120 to configure print settings or the like. Furthermore, the operation panel 210 functions as a display apparatus for notifying the user of status or the like of the first printing apparatus 119 and the second printing apparatus 120. The operation panel 210 is connected to the system bus 211 via the UI-IF 209 of the main control unit 201.

The image processing unit 212 converts a color space (e.g., YCbCr) of a print job into a standard RGB color space (e.g., sRGB), in accordance with a control command received from the main control unit 201. Various kinds of image processing such as resolution conversion into a valid pixel number, image analysis, and image correction are executed as necessary. The print data obtained as a result of the above image processing is stored in the HDD 206.

Figure 3:
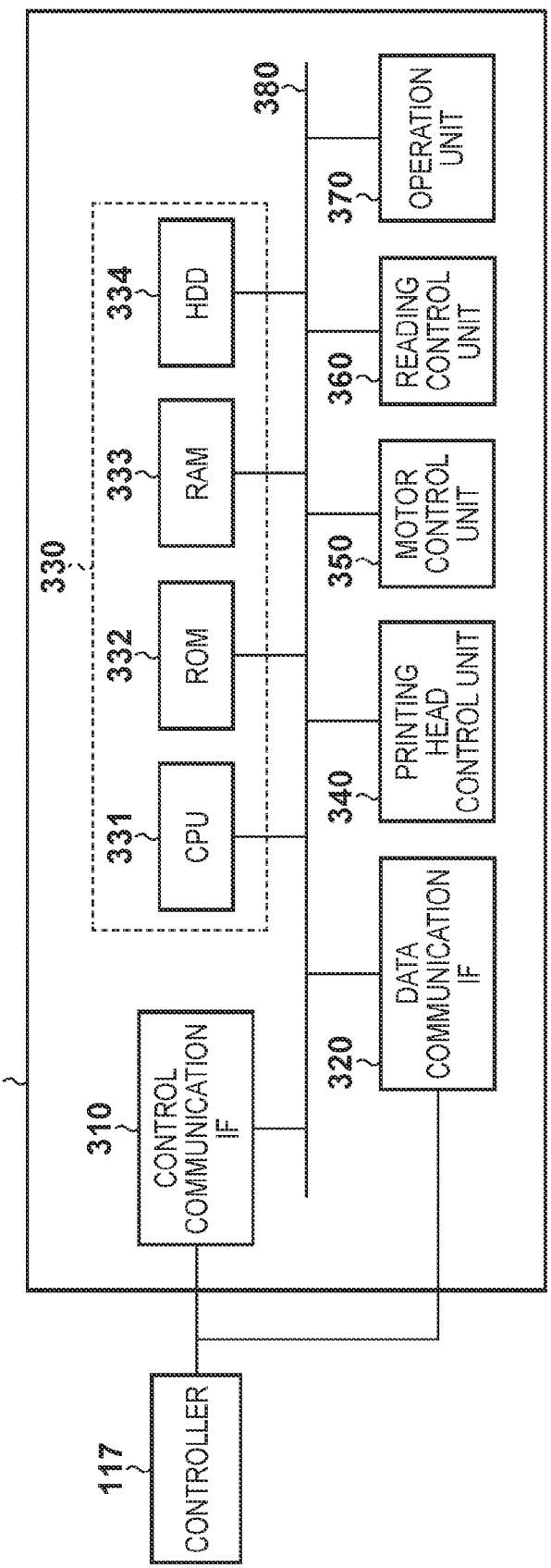
FIG. 3 is a block diagram showing a control configuration of a first printing apparatus and a second printing apparatus.

FIG. 3 is a block diagram showing a control configuration of the first printing apparatus 119 and the second printing apparatus 120. Note that although the first printing apparatus 119 and the second printing apparatus 120 have the same configuration in the present embodiment described below, they may have different configurations. The first printing apparatus 119 and the second printing apparatus 120 each include a control communication IF 310, a data communication IF 320, an engine control unit 330, a printing head control unit 340, a motor control unit 350, a reading control unit 360, and an operation unit 370. These constituent elements are connected to a system bus 380.

The engine control unit 330, the printing head control unit 340, the motor control unit 350, and the reading control unit 360 shown in FIG. 3 are included in both the control units 121 and 122. The operation unit 370 is included in both the operation units 103 and 110. The control communication IF 310 and the data communication IF 320 are interfaces for connecting the first printing apparatus 119 and the second printing apparatus 120 to the controller 117. The control communication IF 310 is an interface for receiving a control command, a status signal, and the like from the controller 117. The data communication IF 320 is an interface for receiving print data from the controller 117.

The engine control unit 330 includes a CPU 331, a ROM 332, a RAM 333, and a HDD 334, and these constituent elements are connected to the system bus 380. The CPU 331 performs various calculations, and comprehensively controls the overall first printing apparatus 119 or the overall second printing apparatus 120. The ROM 332 stores various control programs to be executed by the CPU 331 and necessary data for various operations of the printing apparatuses. The RAM 333 is used as a work area for the CPU 331 and as an area for temporarily storing various received data, and stores various kinds of setting data. The HDD 334 stores necessary parameters for various operations of the printing apparatuses, necessary tables, and the like.

The engine control unit 330 controls the printing head control unit 340, the motor control unit 350, and the reading control unit 360 and prints print data in the printing medium, in accordance with a control command received from the controller 117 via the control communication IF 310. The printing head control unit 340 controls driving of the printing heads 105 and 112 in accordance with a control command received from the engine control unit 330 via the system bus 380 and print data received from the controller 117 via the data communication IFs 127 and 128. The print data is thereby printed on the printing medium.

The motor control unit 350 performs control of a conveyance mechanism, such as control of driving of the conveyance rollers 125 and 126, in accordance with a control command received from the engine control unit 330 via the system bus 380. The reading control unit 360 detects various marks or the like printed on the printing medium, using the sensors 102 and 109, in accordance with a control command received from the engine control unit 330 via the system bus 380. The operation unit 370 is a user input/output IF, and includes an input unit such as a set of hard keys or a touch panel and an output unit such as a display for displaying information or an audio generator. The operation unit 370 sets necessary parameters for various operations of the printing apparatuses, and displays a printing state and the type of the printing medium to be used.

Although the engine control unit 330 controls the printing head control unit 340, the motor control unit 350, and the reading control unit 360 in accordance with a control command received from the controller 117 in the above description of the present embodiment, the present invention is not limited thereto. For example, a control command may be transmitted and received among the control units, or the control units may directly receive a control command from the controller 117. Although the printing head control unit 340 directly receives print data from the controller 117 in the above description of the present embodiment, the present invention is not limited thereto. For example, the engine control unit 330 may receive print data from the controller 117, and the print data may be transmitted from the engine control unit 330 to the printing head control unit 340 via the system bus 380.

Figure 4:
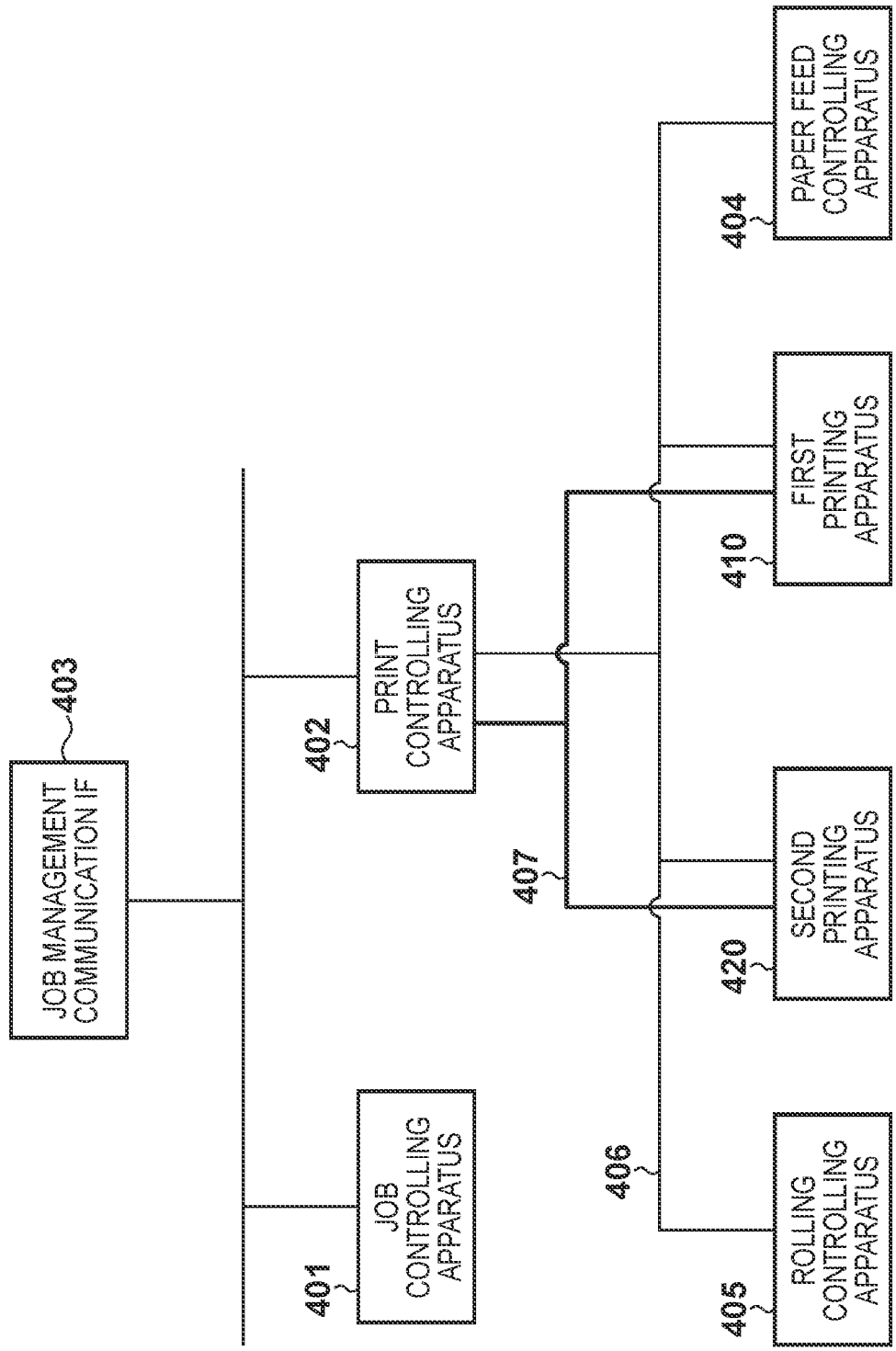
FIG. 4 is a diagram showing a configuration including a print controlling apparatus.

FIG. 4 is a diagram showing a configuration including a print controlling apparatus, and corresponds to FIG. 1. A job controlling apparatus 401 in FIG. 4 generates job data, transmits the job data to a print controlling apparatus 402, and manages the progress thereof. The job controlling apparatus 401 corresponds to the host computers 118 shown in FIG. 1.

The print controlling apparatus 402 receives the job data from the job controlling apparatus 401, performs rendering processing, and transmits print data to a first printing apparatus 410 and a second printing apparatus 420. The print controlling apparatus 402 also collects the state of the apparatuses and management information from the first printing apparatus 410 and the second printing apparatus 420 as appropriate, and manages the state of the printing apparatuses. The print controlling apparatus 402 also transmits a control command to the first printing apparatus 410, the second printing apparatus 420, a paper feed controlling apparatus 404, and a rolling controlling apparatus 405, and controls these apparatuses. Here, the print controlling apparatus 402 corresponds to the controller 117 shown in FIG. 1.

The job controlling apparatus 401 and the print controlling apparatus 402 are connected to a job management communication IF 403 in a mutually communicable manner. The job management communication IF 403 is connected to a LAN, and job data and status are transmitted and received between the job controlling apparatus 401 and the print controlling apparatus 402. The job management communication IF 403 can also be connected to other job controlling apparatuses and print controlling apparatuses (not shown). The job management communication IF 403 corresponds to the host computers 118 shown in FIG. 1 in the network that transmits a print job, or the host computers 118 directly connected to the controller 117, or a portable media such as a USB memory.

The first printing apparatus 410 is a printing apparatus that prints on the front face in two-sided printing, and prints on the front face of the rolled sheet fed from the paper feed controlling apparatus 404. The first printing apparatus 410 corresponds to the first printing apparatus 119 shown in FIG. 1. The second printing apparatus 420 is a printing apparatus that prints on the back face in two-sided printing, and prints on the back face of the rolled sheet that is sent after being discharged from the first printing apparatus 410 and inverted by a paper inversion apparatus (not shown). The second printing apparatus 420 corresponds to the second printing apparatus 120 shown in FIG. 1.

The print controlling apparatus 402 is connected to the first printing apparatus 410 and the second printing apparatus 420 by a control communication IF 406 and a data communication IF 407. The control communication IF 406 transmits and receives the state of the apparatuses and a control command to/from each controlling apparatus. The control communication IF 406 corresponds to the control communication IFs 129, 130, 131, and 132 shown in FIG. 1. Furthermore, for example, the data communication IF 407 is connected by an optical fiber, and can transmit, at a high speed, a large volume of print data from the print controlling apparatus 402 to the first printing apparatus 410 and the second printing apparatus 420. The data communication IF 407 corresponds to the data communication IFs 127 and 128 shown in FIG. 1.

The paper feed controlling apparatus 404 performs control for sending the rolled sheet into the first printing apparatus 410. The rolling controlling apparatus 405 performs control for rolling up the printed rolled sheet discharged from the second printing apparatus 420. The paper feed controlling apparatus 404 and the rolling controlling apparatus 405 are also connected to the control communication IF 406, and transmits and receives the state of the apparatuses and a control command to/from the print controlling apparatus 402, the first printing apparatus 410, and the second printing apparatus 420. The paper feed controlling apparatus 404 and the rolling controlling apparatus 405 correspond to the controller 117 that controls the paper feed unit 101 and the rolling unit 116 shown in FIG. 1.

Figure 5:
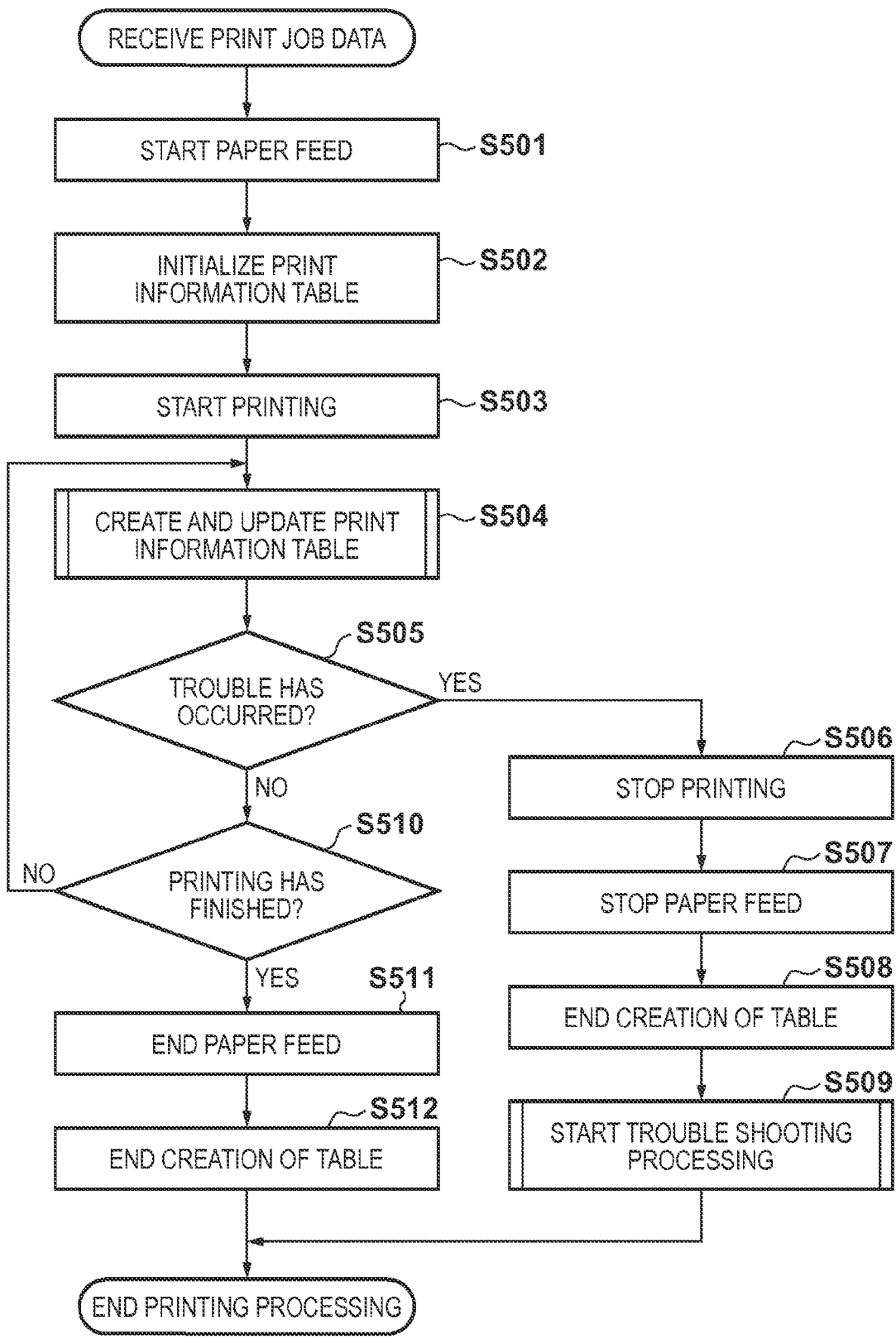
FIG. 5 is a diagram showing procedure of printing processing.

FIG. 5 is a flowchart showing a procedure of printing processing for receiving a print command, creating a feed/printing information table, and performing printing. The processing in FIG. 5 will be described with reference to FIG. 4. The processing in FIG. 5 is realized by the CPU 203 in the controller 117 executing a program and controlling each part, for example. The job controlling apparatus 401 generates a print job and transmits it to the print controlling apparatus 402, and the flow is then started from step S501.

In step S501, paper feed is started. Also, in step S501, measurement of the amount of fed paper (length of supplied rolled sheet) is started with the start of paper feed. In step S502, a later-described printing information table is initialized. The printing information table is initialized based on information held in the print job. Here, the information held in the print job is, for example, information regarding the size of all constituent elements including a cut mark, a blank, and the like that are configured (printed) on the printing medium through the printing processing, and the configuration order, which are defined by the print job. Note that steps S501 and S502 may be simultaneously performed. Next, in step S503, printing is started. This means that the first printing apparatus 119 starts printing on the printing medium loaded in the paper feed unit 101.

Next, in step S504, with the progress of printing, the printing information table is created and updated. The details of step S504 will be described later in FIG. 6. Next, in step S505, it is determined whether or not a trouble has occurred in the printing system. Here, the trouble (error) refers to a phenomenon with which the printing processing in progress cannot be normally continued or ended, such as the occurrence of a jam, detection of non-discharge, or an unexpected stop of the printing system, for example.

If it is determined that a trouble has occurred (YES in step S505), printing is stopped in step S506, and paper feed to the first printing apparatus 119 is stopped in step S507. Furthermore, in step S508, creation of the printing information table ends. Note that steps S506 to S508 may be simultaneously performed.

Next, in step S509, trouble shooting processing is started, and the processing shown in FIG. 5 ends. The details of step S509 will be described later in FIG. 7. If it is determined in step S505 that a trouble has not occurred, the processing proceeds to step S510, and it is determined whether or not printing has finished. Here, if it is determined that printing has not finished, the processing from step S504 is repeated. On the other hand, if it is determined that printing has finished, paper feed to the first printing apparatus 119 is ended in step S511, and creation of the printing information table ends in step S512. Note that steps S511 and S512 may be simultaneously performed.

FIG. 6 is a flowchart showing procedure of the processing in step S504 in FIG. 5. In the processing shown in FIG. 6, the printing information table initialized based on a print job is updated using information regarding printing in progress. FIG. 13 is a diagram showing an exemplary printing information table that is created and updated in this flow. Initially, in step S601, information regarding printing in progress is acquired. Here, the information regarding printing in progress is information that is not contained in the print job, and is, for example, information including started printing information and finished printing information regarding all constituent elements to be printed. Furthermore, the information regarding printing in progress also includes information regarding constituent elements that is not included in the print job, such as preliminary discharge that is inserted during printing. The size of the constituent elements, configuration order information, a change of the size of a blank due to unexpected sheet conveyance, and the like also correspond to the information regarding printing in progress. That is to say, the above information is information that cannot be acquired when the first printing apparatus 119 receives the print job, and is information that is updated with the progress of started printing. In step S602, with the progress of the printing, the printing information table initialized in step S502 in FIG. 5 is updated based on the information acquired in step S601. After the processing shown in FIG. 6 ends, the processing proceeds to step S505 in FIG. 5.

FIG. 13 is a diagram showing an exemplary printing information table. In the present embodiment, all images and blanks configured on the printing medium at a point in time can be specified by referencing the printing information table. An item 1301 in the printing information table indicates an image type or a blank configured on the printing medium. An item 1302 indicates execution information for specifying each of a plurality of images and blanks. An item 1303 indicates the order in which images and blanks are configured on the printing medium. An item 1304 indicates the length of each image or blank in the conveyance direction. For example, "20" means that the length in the conveyance direction is 20 pixels long. This item 1304 is calculated based on a result of the measurement by the encoder 123. An item 1305 indicates the accumulated length in the conveyance direction from a sheet conveyance start position to the position where each image or blank is configured. An item 1306 indicates whether or not each image has started to be printed. An item 1307 indicates whether or not each image has finished being printed. Note that if a blank occurs due to a shift of a printing position caused by a conveyance error, or if a redundant blank is inserted, this blank is added to the items.

The image types handled in the item 1301 include an image based on print data ("image" in FIG. 13), "preliminary discharge", and "cut mark", for example. The information specified in the item 1302 includes "paper feed blank 1", "preliminary discharge 1", "image 1", "cut mark 1", and "image 2", for example. Here, the number that follows each image type or blank indicates the number of times that the image or blank has appeared since sheet conveyance is started. In the items 1306 and 1307, "1" indicates that printing has started and ended, and "0" indicates that printing has not yet started and ended, respectively.

Each value in the item 1305 is accumulation of the "length" of each image or blank. The accumulated length of each blank or image is the length from a paper feed start position on the printing medium to the position where the blank or image is configured. Since the blanks and images configured on the printing medium are covered by the information in this table, the total lengths thereof coincides with the length from the paper feed start position to the position where each blank or image is configured.

Since "print start" and "print end" items indicate information for determining whether printing of an image has started and ended, a value is written only when "image type or blank" is "image". The above is information indicating whether or not printing of each image on the printing medium has started, and whether or not printing on the printing medium has finished. For example, since printing of "image 1" has started and also has finished, it can be determined that printing of the image has finished to the end, while printing of "preliminary discharge 2" has started but not yet finished. It can thereby be determined that printing of "preliminary discharge 2" is in progress. Note that, although the printing information table is in the form of a table in FIG. 13, other forms may be used as long as the above-described information is held.

If the initialization in step S502 is executed, the printing information table shown in FIG. 13 is reconfigured based only on the information contained in the print job that is a print target. For example, the printing information table is created based only on the information indicated by "image" in the item 1301 in FIG. 13. After the initialization in step S502, the printing information table continues to be updated until the table creation ends in step S508 or S512. That is to say, assuming that the printing information table contains "image 1" and "image 2" in the item 1302 when the table is initialized in step S502, the other constituent elements are sequentially added in step S504 such that the printing information table is configured as shown in FIG. 13. For example, when "paper feed blank 1" is started, it is added prior to "image 1" in the printing information table, based on the configuration order. Then, if "paper feed blank 1" finishes and printing of "preliminary discharge 1" is started before printing of "image 1" is started, "preliminary discharge 1" is added after "paper feed blank 1" and before "image 1". Thus, the printing information table is sequentially updated in step S504. If a trouble such as a jam occurs in the middle of the printing processing, printing is stopped as described regarding step S505 in FIG. 5. Here, the content of the printing processing that has been performed until the trouble occurs is indicated in the printing information table in FIG. 13. This content includes not only the information contained in the print job but also information regarding preliminary discharge and blanks.

FIG. 7 is a flowchart showing procedure of the processing in step S509 in FIG. 5. In the processing shown in FIG. 7, if a trouble occurrence portion on the printing medium is cut out, the cut-out portion is specified. Initially, in step S701, it is determined whether or not cutting of a trouble occurrence portion has been detected. Here, the trouble occurrence portion indicates the printing medium at a portion affected by the aforementioned trouble, and refers to a portion damaged due to a jam or a portion with abnormal printing due to non-discharge, for example. Whether or not the trouble occurrence portion (error occurrence position) has been cut out is detected by each printing apparatus, based on a user operation performed after the cutting. Here, the operation performed after the cutting is, for example, pressing of a button on a screen displayed on the operation units 103 and 110 or on each apparatus, and this button-pressing operation means that the trouble has been solved. If the cutting is detected, the processing proceeds to step S702, and if not, the processing proceeds to step S704.

In step S702, processing for specifying the trouble occurrence portion is performed. The details of step S702 will be described later in FIG. 8. After the trouble occurrence portion is specified in step S702, in step S703, the information of the trouble occurrence portion specified in step S702 is stored in the RAM 333. In step S704, it is determined whether or not to reprint the trouble occurrence portion. If it is determined that reprinting is not to be performed, the processing in FIG. 7 ends. If it is determined that reprinting is to be performed, the processing proceeds to step S705, and trouble occurrence portion reprinting processing is performed. The details of step S705 will be described later in FIG. 10.

Here, reprinting means that an image that has been printed once is printed again. Restart of a printing operation after the printing operation is stopped will be referred to as "printing restart". The determination regarding reprinting in step S704 may be performed in accordance with an instruction of the user who operates the printing system, or may be preset in job data. After the processing shown in FIG. 7 ends, the processing in FIG. 5 simultaneously ends.

FIG. 8 is a flowchart showing procedure of the processing in step S702 in FIG. 7. In the processing shown in FIG. 8, the length of the remaining printing medium after the trouble occurrence portion is cut out is measured, and the trouble occurrence portion is specified. It is assumed that the remaining printing medium after the trouble occurrence portion is cut out is not affected by a trouble such as damage, stain, or non-discharge.

Initially, in step S801, the printing medium existing on the paper feed unit 101 side when the trouble occurrence portion is cut out starts to be rolled back onto the paper feed unit 101. In step S802, the amount of the printing medium rolled back onto the paper feed unit 101 is measured. In step S803, it is determined whether or not the rolling back of the printing medium existing on the paper feed unit 101 side has ended, and if it is determined that the rolling back has not ended, the processing returns to step S802 and the measurement of the amount of the printing medium rolled back onto the paper feed unit 101 is continued. On the other hand, if it is determined that the rolling back has ended, the processing proceeds to step S804.

In step S804, the printing medium existing on the rolling unit 116 side when the trouble occurrence portion is cut out starts to be rolled up onto the rolling unit 116. In step S804, as in steps S801 to S803, the length of the rolled-up printing medium is measured. The details of step S804 will be described later in FIG. 9.

A description will now be given of positions of starting and ending the measurement of the length of the printing medium in step S802. When the printing medium is cut out due to the occurrence of a trouble, if the cut edge is vertical to the conveyance direction, the point of starting the measurement is the cut edge, i.e., an end point of the printing medium, which does not require special consideration. However, there are cases where the shape of the cut edge is peculiar, as in the case where the cut edge is oblique, or is irregular due to damage. When measuring the length of the printing medium whose cut edge has such a shape, the point of starting the measurement needs to be considered. When measuring the length of the printing medium having a peculiar cut edge, even if the cut edge of the printing medium is simply set to the measurement start point, the sheet width at this cut edge is not necessarily equal to the sheet width of the printing medium. For example, if the cut edge of the printing medium is oblique, a portion exists in which the sheet width is shorter than the original sheet width unique to the printing medium. Moreover, when the cut edge is toothed (with fine nicks), there is a portion where paper does not exists in the sheet width direction. In this manner, there are cases where the sheet width on the cut edge is not fixed and is different from the original sheet width unique to the printing medium (continuous sheet in the present embodiment).

In the aforementioned case where the sheet width is different from the sheet width unique to the printing medium, the printing medium cannot serve as a finished product in terms of the quality of the printing medium. Accordingly, in the present embodiment, the measurement is started from a point where the sheet width on the cut edge is equal to the sheet width unique to the printing medium. That is to say, in steps S802 and S804, processing is not performed until the sheet width with which the printing medium can serve as a finished product (sheet width unique to the printing medium) is confirmed, and the processing is performed from the position where the sheet width unique to the printing medium is confirmed. In other words, in steps S802 and S804, the measurement of the printing medium length is started from the point in time when the sheet width unique to the printing medium is confirmed. Here, the method for checking the sheet width on the cut edge is not particularly limited, and may be a method using the paper end detection sensor, for example. For example, the paper end detection sensor is arranged at a position in the first printing apparatus 119 at which the end portion of the sheet rolled up after the trouble occurrence portion is cut out can be detected, and is also arranged at a position in the second printing apparatus 120 at which the end portion of the sheet rolled up after the trouble occurrence portion is cut out can be detected. In the case of using the paper end detection sensor, it need only be determined whether the printing medium having a predetermined width in the sheet width direction can be detected, by arranging the sensor in the sheet width direction and/or scanning the sheet. For example, if the cut edge is oblique, the detected sheet width is smaller than the sheet width unique to the printing medium, and if the cut edge is toothed, a portion in which the printing medium cannot be detected in the sheet width direction is found. For example, if the cut edge is toothed as shown in 15A to 15C of FIG. 15, a portion in which the printing medium cannot be detected in the sheet width direction is found at the position in 15B of FIG. 15, and accordingly the measurement is not started. Then, at the position in 15C of FIG. 15, there is no portion in which the printing medium cannot be detected in the sheet width direction, i.e., the printing medium having the predetermined sheet width is found, and accordingly the measurement is started.

In step S805, the cut trouble occurrence portion is calculated based on the amount of the fed paper measured in step S501 in FIG. 5 and the amount of rolled-back paper and the amount of rolled-up paper measured in steps S801 to S804. The length of the trouble occurrence portion is calculated by Equation (1).

Length of trouble occurrence portion=(amount of fed paper measured in step S501 in FIG. 5)−(amount of rolled-back paper measured in step S802+ amount of rolled-up paper measured in step S804) (1)

Then, regarding the position of the trouble occurrence portion, the starting point of the trouble occurrence can be calculated by [(amount of fed paper measured in step S501 in FIG. 5)−(amount of rolled-back paper measured in step S802)]. Furthermore, the end point of the trouble occurrence can be calculated by adding the length of the trouble occurrence portion to the starting point of the trouble occurrence. The calculated trouble occurrence portion is information of the position where the trouble has occurred on the printing medium that has been fed since the point in time of starting the processing in FIG. 5. For example, the position information indicating that "a trouble has occurred in a portion starting from a 10 m 23 cm point up to a 11 m 43 cm point from the paper feed starting point of the printing medium" is calculated.

Next, in step S806, the image printed in the trouble occurrence portion is specified using the information regarding the trouble occurrence portion calculated in step S805 and the printing information table created in FIG. 5. The details of the method for specifying the image will be described later using FIG. 14.

Here, all images configured on the printing medium are targets of the aforementioned specification, and the information to be specified includes the length of the image printed on the trouble occurrence portion, in addition to identification information of each image. For example, the information to be specified is information indicating that "an image A is printed and has a length of 10.5 mm from the left sheet end in the trouble occurrence portion". Next, in step S807, an unfinished image remaining on the printing medium rolled up in steps S801 to S804 is specified, and this flow ends. Here, the unfinished image refers to an image that is cut in the middle when the trouble occurrence portion is cut out, and is printed in an unfinished state on the printing medium rolled up in steps S801 to S804. The details of the method for specifying the unfinished image will be described later using FIG. 14. After the processing in FIG. 8 ends, the processing proceeds to step S703 in FIG. 7.

Figure 9:
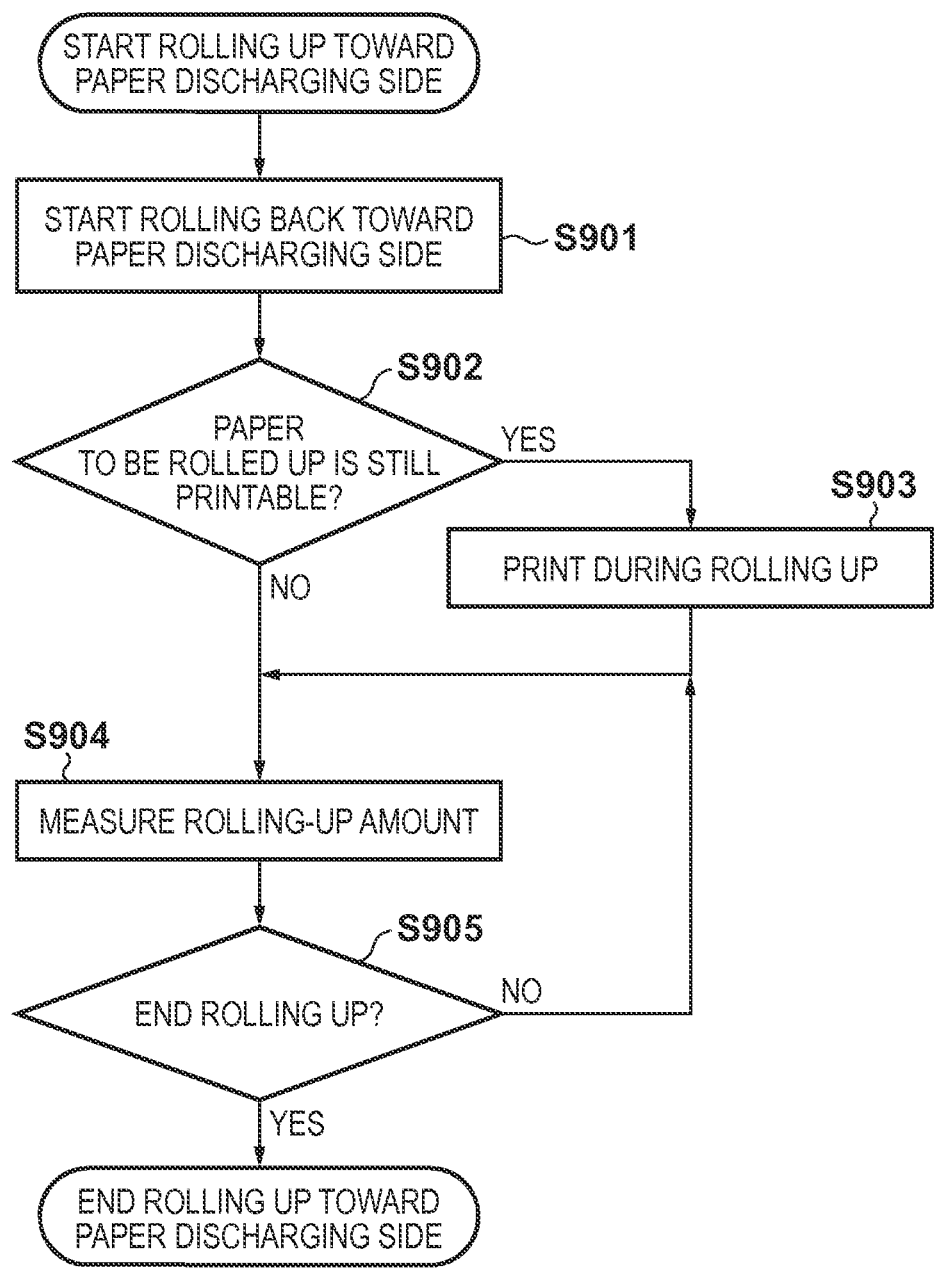
FIG. 9 is a diagram showing procedure of processing in step S804 in FIG. 8.

FIG. 9 is a flowchart showing procedure of the processing in step S804 in FIG. 8. In the processing in FIG. 8, the length of the printing medium rolled up from the trouble occurrence portion toward the paper discharging side is measured. In step S901, the printing medium existing on the rolling unit 116 side when the trouble occurrence portion is cut out starts to be rolled up onto the rolling unit 116. In step S902, it is determined whether or not the printing medium rolled up onto the rolling unit 116 is still printable. Here, "being still printable" refers to the printing medium in a state of "being able to serve as a finished product if only the back face thereof is printed", for example. Specifically, it indicates the case where a part of the printing medium that is already printed by the first printing apparatus 119 can be additionally printed by the second printing apparatus 120, e.g., can undergo printing on the back face, for example. The printed printing medium in this case does not include a portion including an image that no longer serves as a finished product due to being cut out. It is determined whether or not the printing medium is still printable, based on the printing information table in FIG. 13 and the information of the paper end detection sensor. Specifically, it is determined whether or not there is an image to be printed on the printing medium that is being rolled up onto the rolling unit 116, by referencing the printing information table. This is because the image to be printed by the second printing apparatus 119 is also designated in the print job for tandem printing received by the first printing apparatus 119, and is also reflected in the printing information table. If a sheet end of the printing medium that is being rolled up is detected in the second printing apparatus 120 and the printing medium has been cut out in a portion that is not at a position where the printing medium can serve as a finished product, it is determined that this finished product is to be discarded (the printing medium is not printable), and the processing proceeds to step S904. In the present embodiment, specifically, if the sheet width on the cut edge is not equal to the sheet width unique to the printing medium, it is determined that this finished product is to be discarded, as in the description of step S802. If it is determined that the printing medium is still printable, the processing proceeds to step S903, printing is performed while rolling up the printing medium onto the rolling unit 116, and then the processing proceeds to step S904.

In step S904, the amount of the printing medium rolled up onto the rolling unit 116 is measured, and the processing proceeds to step S905. In step S905, it is determined whether or not the rolling up of the printing medium existing on the rolling unit 116 side has finished, and if not finished, the processing returns to step S904, and the measurement of the amount of the printing medium rolled up onto the rolling unit 116 is continued. If it is determined that the rolling up has finished, the processing in FIG. 9 ends. After the processing in FIG. 9 ends, the processing proceeds to step S805 in FIG. 8.

Figure 10:
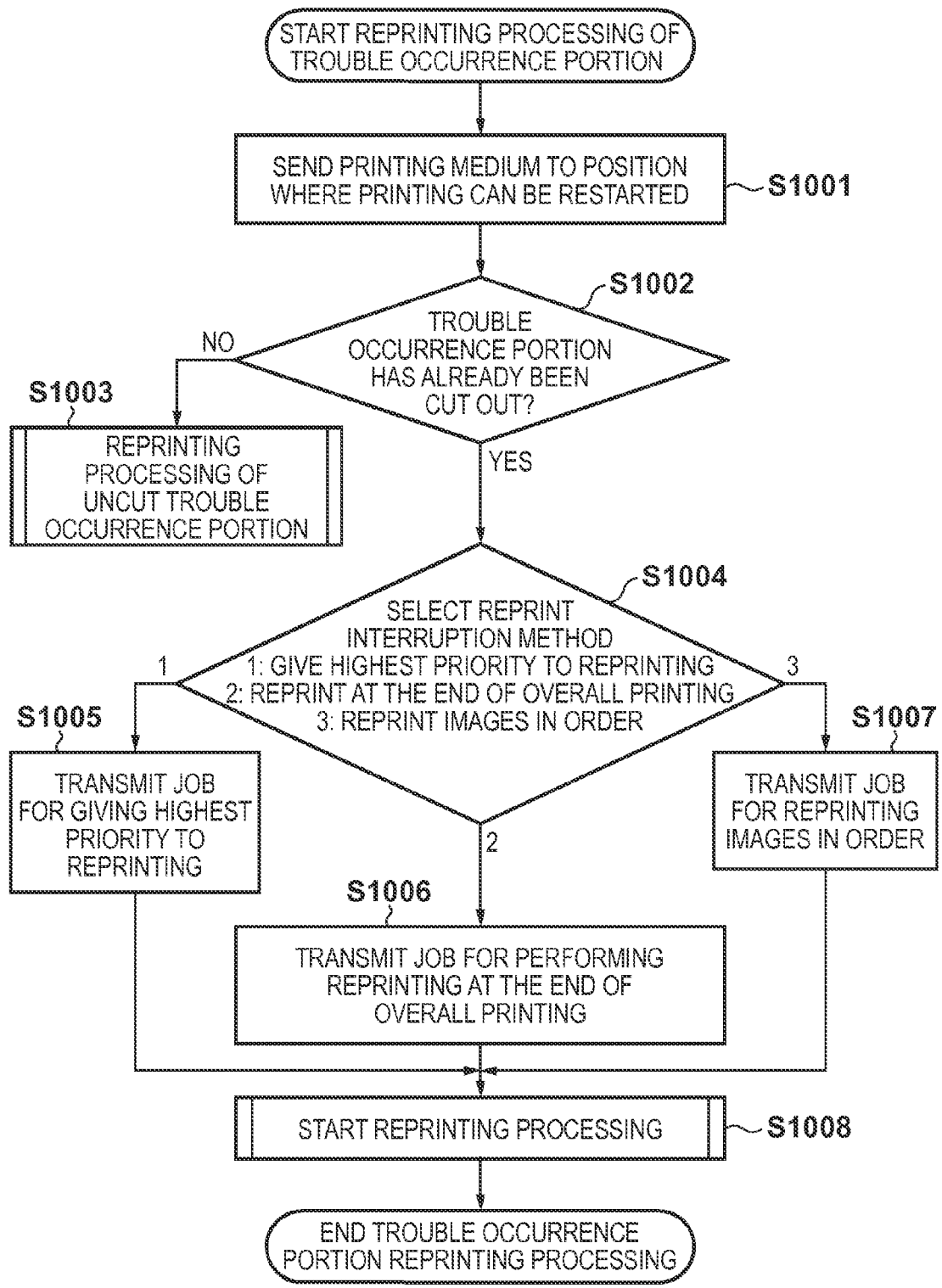
FIG. 10 is a diagram showing procedure of processing in step S705 in FIG. 7.

FIG. 10 is a flowchart showing procedure of the processing in step S705 in FIG. 7. In the processing in FIG. 10, the first printing apparatus 119 reprints the trouble occurrence portion. Initially, in step S1001, the printing medium is sent to a position where printing can be restarted. At the point in time when this flow is started, as described in FIG. 8, all printing medium remaining after the trouble occurrence portion is cut out has been rolled up onto the paper feed unit 101. For this reason, in order to restart the suspended printing operation, the printing medium rolled up onto the paper feed unit 101 needs to be fed again to the position where printing can be restarted. Here, the position where printing can be restarted indicates the position to which the printing medium is moved such that an image to be reprinted does not overlap an unfinished image remaining on the printing medium specified in FIG. 8.

Next, in step S1002, it is determined whether or not the trouble occurrence portion has already been cut out, and if it is determined that the trouble occurrence portion has not yet been cut out, the processing proceeds to step S1003, and reprinting processing of uncut trouble occurrence portion is performed. The details of step S1003 will be described later using FIG. 12. Note that step S1003 will be described in a second embodiment.

If it is determined in step S1002 that the trouble occurrence portion has already been cut out, the processing proceeds to step S1004, and a reprinting interruption method is selected. The reason why the reprinting interruption method can be selected is because the required printing order (timing) for reprinting is different due to various factors, such as convenience of a post-process and users' working hours. In the present embodiment, this timing is classified into the following three types.

Reprinting interruption method 1: this is a mode in which reprinting is given the highest priority. If this mode is selected, the processing proceeds to step S1005, and a print job for reprinting a portion that needs to be reprinted is transmitted immediately after the reprinting is started. This timing is selected in the case where, for example, the user wants to obtain the portion that needs to be reprinted as a finished product as soon as possible. Here, a print job for reprinting an unfinished image remaining on the printing medium is transmitted to the first printing apparatus 119.

Reprinting interruption method 2: this is a mode in which reprinting is performed at the end of the overall printing of a print job. If this mode is selected, the processing proceeds to step S1006, and after the printing is restarted, a print job for performing processing for printing subsequent images excluding a portion that needs to be reprinted and then reprinting, after all of this processing ends, the trouble occurrence portion is transmitted to the first printing apparatus 119. For example, consider the case where a print job that is set so as to print images 1 to 10 is suspended due to a trouble in the middle of printing of the image 6, and the image 6 needs to be reprinted. In this case, after the printing is restarted, the images 7 to 10 are printed first, and the image 6 is thereafter reprinted. That is to say, the printing of the image 6 that needs to be reprinted is postponed, and the other images to be printed are printed first.

Reprinting interruption method 3: this is a mode of reprinting images in order. In this mode, for example, if a print job that is set so as to print images 1 to 10 is suspended due to a trouble in the middle of printing of the image 6, all of the images 1 to 10 are reprinted. If this mode is selected, the processing proceeds to step S1007, and a print job for discarding all printing medium that has been rolled up onto the paper feed unit 101 after the occurrence of the trouble and reprinting all discarded portion, starting from an image in the trouble occurrence portion is transmitted to the first printing apparatus 119. For example, this mode may be selected in the case where, even if a trouble has occurred, the user wants to print images in order continuously from the finished product on which printing has already been normally finished by the second printing apparatus 120. By selecting this mode, it is possible to avoid confusion of the order of finished products due to reprinting interruption during processing in a post-process.

The modes in steps S1005 to S1007 may be selected on a user interface screen displayed on the operation units 103 and 110, for example. After the processing in steps S1005 to S1007, the processing proceeds to step S1008 to start reprinting processing. A description of the details of step S1008 will be omitted since it is similar to the flow described in FIG. 5.

Note that, in the present embodiment, a configuration in which the printing medium is rolled up after cutting out the trouble occurrence portion is realized by the paper feed unit 101 and the rolling unit 116 in the tandem printing system shown in FIG. 1. However, if a printing system has a unit for supplying the printing medium and a unit for rolling up the printing medium on which printing has finished, the configuration in which the printing medium is rolled up after cutting out the trouble occurrence portion is not limited to the above one. Furthermore, although the printing system shown in FIG. 1 is a tandem printing system, the printing system is not limited to a tandem printing system as long as the printing system has a unit for supplying the printing medium and a unit for rolling up the printing medium, as mentioned above.

Although the calculated length of the printing medium for the trouble occurrence portion, or the like, is expressed in units of meters, centimeters, and millimeters in the present embodiment, these are exemplary expressions of lengths, and the unit is not limited thereto. Although a cause of cutting out the printing medium is occurrence of a trouble in the present embodiment, the present invention is also applicable to the case where printing is suspended and a phenomenon in which the printing medium is cut out occurs, apart from the occurrence of a trouble.

Figure 14:
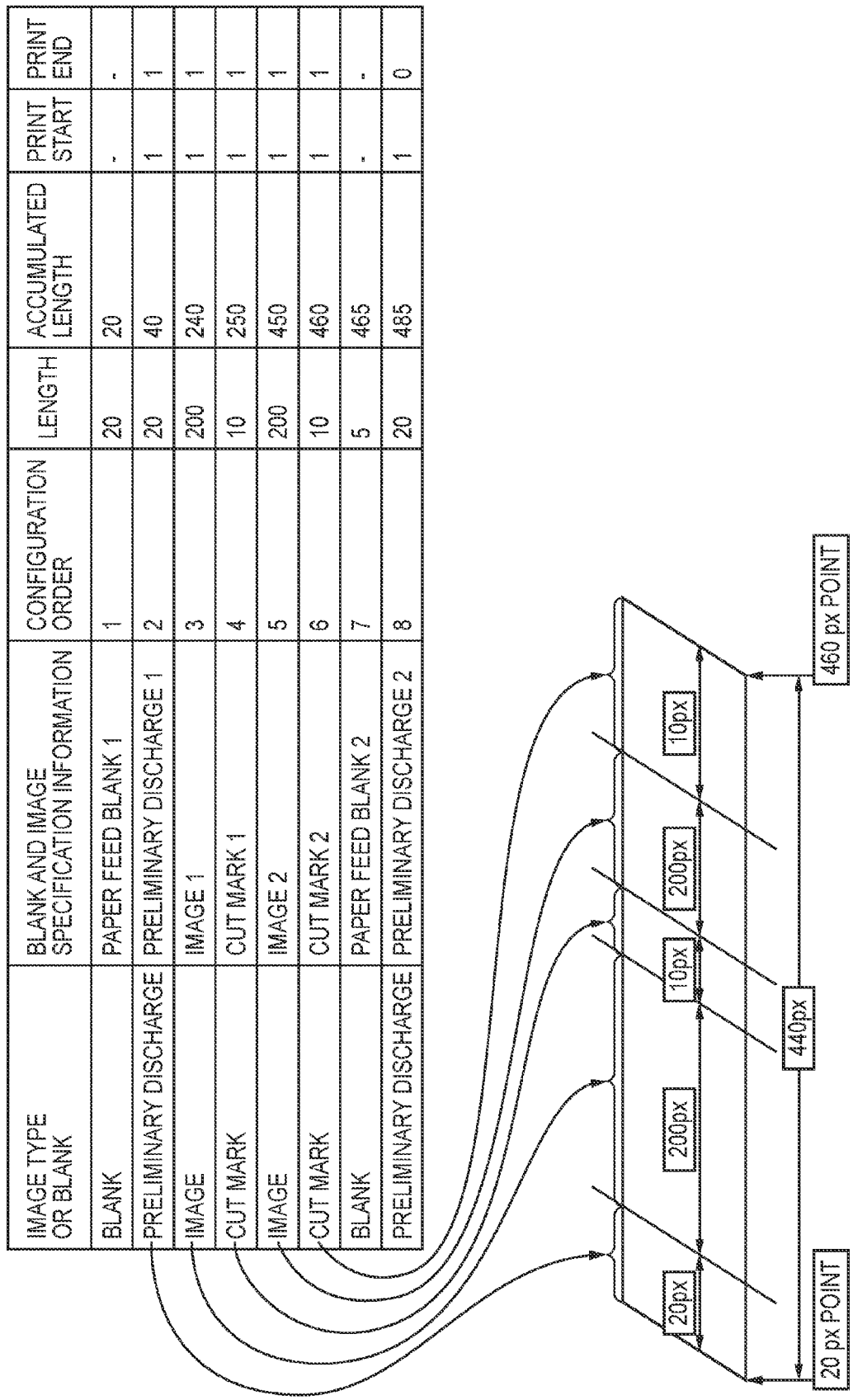
FIG. 14 is a diagram illustrating a method for specifying images and blanks using the printing information table.

FIG. 14 is a diagram for illustrating a method for specifying all images and blanks configured on the printing medium, using the printing information table. Here, the printing information table is the table shown in FIG. 13. The table in FIG. 14 is the printing information table, and the diagram below the table shows a part of the printing medium. As shown in FIG. 14, the information of each element that is held in the printing information table and is configured on the printing medium corresponds to an element that is actually configured on the printing medium as indicated by arrows. That is to say, the information regarding what is configured in a portion indicated by each arrow on the printing medium and the like can be acquired by referencing the printing information table.

As described in FIG. 13, the printing information table covers the information of all blanks and images configured on the printing medium from the position where paper feed is started. For example, information regarding "what is printed from the point of 20 pixels away from the paper feed start point on the fed printing medium to the point of 460 pixels" can be acquired by referencing the printing information table. In FIG. 14, it can be found that "preliminary discharge 1", which is the last object to be printed in the range of the "accumulated length" up to 40 pixels in the printing information table and is to be configured immediately after "paper feed blank 1", is printed up to the point of 40 pixels from the paper feed start point.

As also described in FIG. 13, the accumulated length up to a certain image or blank coincides with the length from the paper feed start position to the position where this blank or image finished being configured. Next, it can be found that what is printed at the point of 460 pixels is "cut mark 2", which is the last object to be printed in the range of the accumulated length up to 460 pixels. Accordingly, it can be found that "what is printed from the point of 20 pixels from the paper feed start point on the fed printing medium up to the point of 460 pixels" is "preliminary discharge 1" to "cut mark 2" that correspond respectively to the second to the sixth in the configuration order. Furthermore, it can also be found, by referencing the information of "print start" and "print end", whether the images to have been printed from the point of 20 pixels from the paper feed start point on the printing medium to the point of 460 pixels has finished being printed, are being printed, or are unprinted. Regarding an image that is being printed, the length indicating the portion of the image up to which printing from the image printing start point has finished is the difference between the amount of paper that has been fed at this point in time and the accumulated length up to the previous image or blank of the image that is being printed.

According to the present embodiment, the position where suspension has occurred can be specified without the need for an identification mark. Accordingly, the page from which printing is to be restarted and the page that needs to be reprinted can be accurately specified without the need for an identification mark. In the present embodiment, even if an identification mark for specifying a page is cut out, or there is a printing failure, or an erroneous detection of a sensor occurs, the position where suspension has occurred can be accurately specified. Furthermore, even if the position cut out by the user overlaps an image, or there is a shift in a printing position or insertion of a redundant blank, the position where suspension has occurred can be accurately specified.

The present embodiment has described the case where printing processing is suspended, a part of the printing medium is cut out, and reprinting is thus necessary. According to the present embodiment, a configuration for printing an image identification mark and detecting the identification mark is not necessary. Since a result of the measurement of the printing medium length and the printing information table are used as the method for specifying the cut-out printing medium, the printing system does not need a special printing mechanism, sensor, or the like for the identification mark. In the case of not providing a special printing mechanism, sensor, or the like for the identification mark, occurrence of a space for printing the identification mark on the printing medium, processing for removing the identification mark from a finished product, and dust resulting from this removal can also be avoided. Note that the identification mark may be printed, and in this case, a check may be performed using both a method using the identification mark and the method according to the above-described present embodiment.

Furthermore, in the present embodiment, a cut-out portion is specified, and a reprint job for a portion that needs to be reprinted is generated. At this time, a result of the measurement of the printing medium length and the printing information table are used. Furthermore, the priority of reprinting can be selected, and printing can be restarted after a trouble while handling various situations around the user. Moreover, the printing medium that is not affected by the occurrence of a trouble and can serve as a finished product by performing additional printing, such as printing on the back face, thereon after restarting printing is not wasted, and can be completed as a finished product by performing necessary additional printing. For example, when performing two-sided printing, a portion of the first face (front face) on which images have been correctly formed by the first printing apparatus 119 does not need to be discarded, and images can also be formed on the second face (back face) by the second printing apparatus 120, thereby enabling the printing medium to be effectively used. Furthermore, for example, the printing medium can be effectively used in the case of performing printing with the second printing apparatus 120 over an image printed by the first printing apparatus 119. At this time as well, a result of the measurement of the printing medium length and the printing information table can be used, and accordingly the aforementioned additional mechanism is not necessary.

Second Embodiment

In the above-described first embodiment, a portion affected by a trouble occurring during printing processing, i.e., the trouble occurrence portion is cut out, thereafter the trouble occurrence portion is specified, and reprinting is performed. In the present embodiment, the trouble occurrence portion is specified in a state where the trouble occurrence portion is not cut out, and reprinting is performed. The case where reprinting is performed in a state where the trouble occurrence portion is not cut out is, for example, a case where, although a trouble has occurs, it does not affect subsequent conveyance of the printing medium or does not affect normal printing. A case is also assumed where the user wants to immediately restart reprinting after the occurrence of a trouble, because of an emergency.

If reprinting is performed without cutting out the trouble occurrence portion, unlike in the first embodiment, it is necessary to perform reprinting, considering the trouble occurrence portion remaining uncut in each apparatus body constituting the printing system. In order not to accept the trouble occurrence portion of the printing medium as a normal finished product, and in order to convey the trouble occurrence portion similarly to the normal printing medium within each apparatus constituting the printing system, processing is necessary for specifying the trouble occurrence portion and then not treating the trouble occurrence portion as a finished product.

The first embodiment has described the case of cutting out the trouble occurrence portion. In the first embodiment, reprinting is performed while considering a portion that is connected to the cut-out printing medium and is left within each apparatus constituting the printing system. This is because only the portion connected to the cut-out printing medium is affected by the occurrence of the trouble. On the contrary, in the present embodiment, a portion affected by the occurrence of the trouble may possibly exist at any position on the printing medium that is being conveyed.

Differences from the first embodiment will be described below with reference to FIGS. 1 to 4 and 13 to 15.

Figure 11:
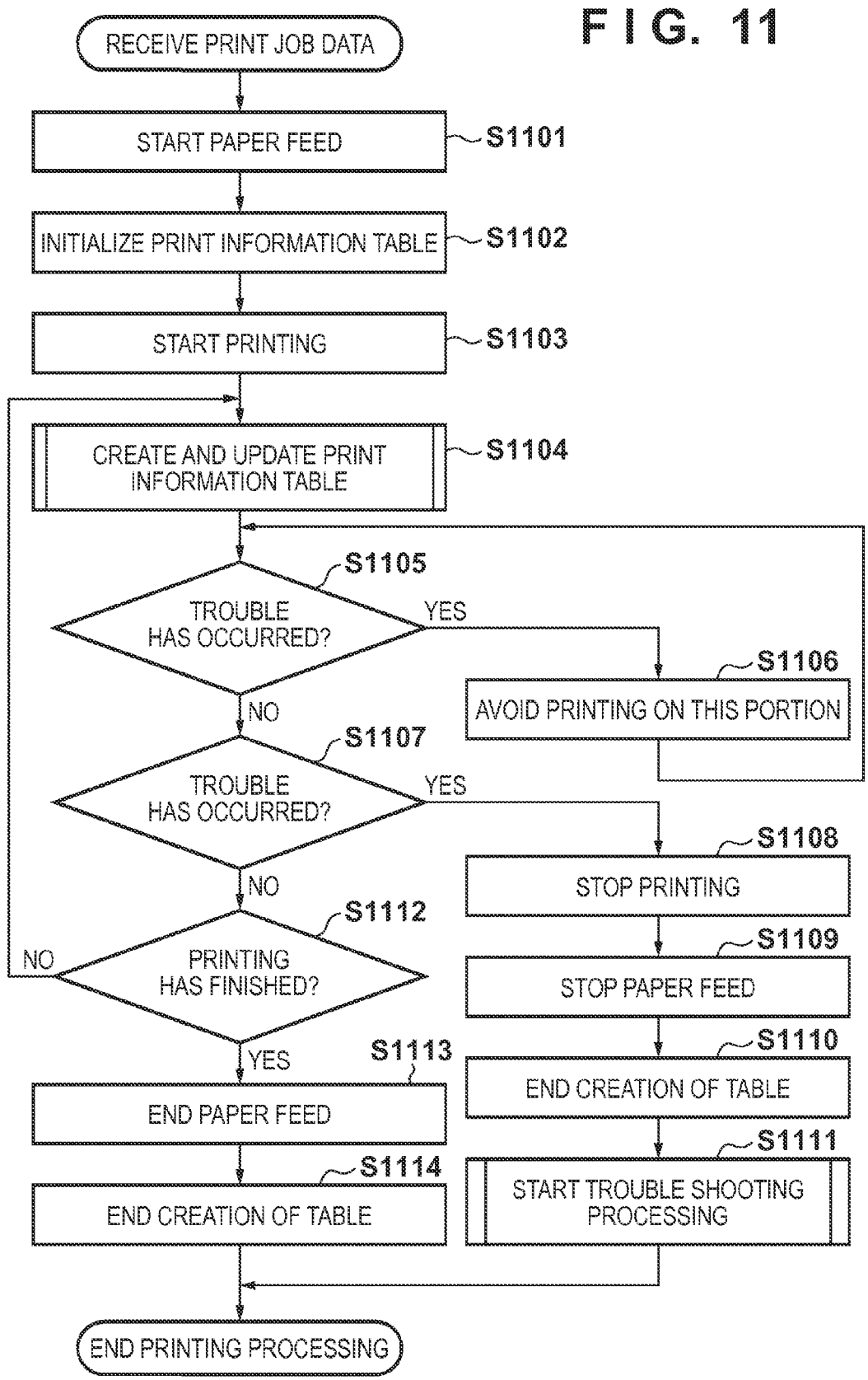
FIG. 11 is another diagram showing procedure of printing processing.

FIG. 11 is a flowchart showing procedure of printing processing for receiving a print command and creating a paper feed/printing information table, while considering whether or not a trouble occurrence portion exists on the printing medium. The processing in FIG. 11 is realized by the CPU 203 in the controller 117 executing a program and controlling each unit, for example.

Processing in steps S1101 to S1104 are the same as processing in steps S501 to S504 in FIG. 5, and accordingly a description thereof will be omitted. In step S1104, with the progress of printing, the printing information table is created and updated, and thereafter, in step S1105, it is determined whether or not a portion of the printing medium that is about to be printed is the trouble occurrence portion. If it is determined that the portion is the trouble occurrence portion, the processing proceeds to step S1106, the printing medium is conveyed without printing on this portion, and the processing returns to step S1105. For example, the trouble occurrence portion is a portion where the printing medium is stained or where non-discharge has occurred, and is a portion that cannot serve as a normal finished product. In step S1106, printing on such a portion is avoided. On the other hand, if it is determined that the portion is not the trouble occurrence portion, the processing proceeds to step S1107.

In step S1107, it is determined whether or not a new trouble has occurred in addition to the trouble occurrence portion regarding which the determination is performed in step S1105. The determination in step S1107 is similar to step S505, and accordingly a description thereof will be omitted.

If it is determined in step S1107 that a trouble has occurred, the processing proceeds to step S1108. Steps S1108 to S1111 are similar to steps S506 to S509, and accordingly a description thereof will be omitted.

If it is not determined in step S1107 that a trouble has occurred, the processing proceeds to step S1112, and it is determined whether or not the printing has finished. If the printing has not finished, the processing returns to step S1104, and if the printing has finished, the processing proceeds to step S1113. Steps S1113 and S1114 are similar to steps S511 and S512, and accordingly a description thereof will be omitted.

Figure 12:
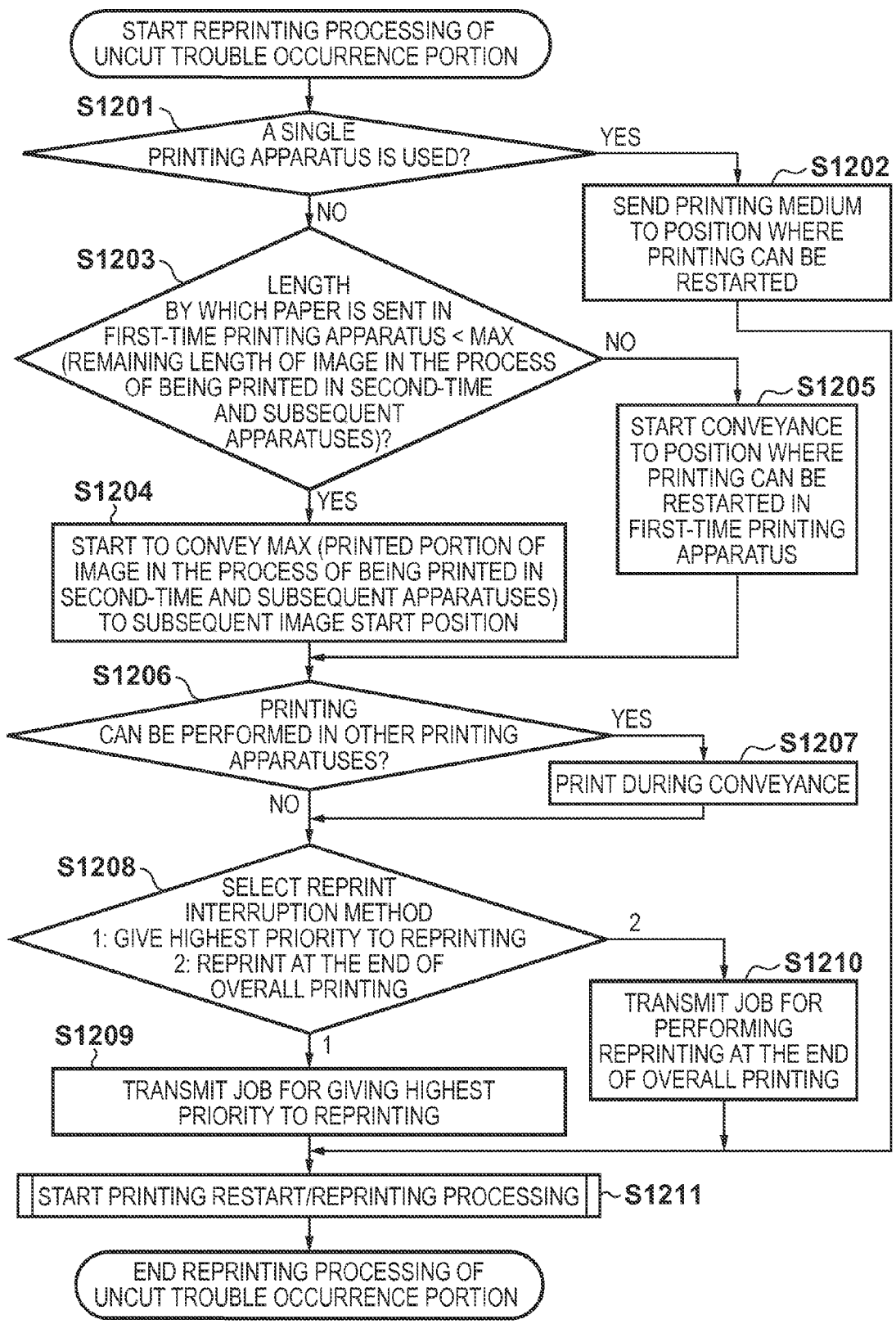
FIG. 12 is a diagram showing procedure of processing for reprinting a trouble occurrence portion.

FIG. 12 is a flowchart showing procedure of processing for reprinting the trouble occurrence portion without cutting out the trouble occurrence portion. FIG. 12 corresponds to step S1003 in FIG. 10, and in the processing in FIG. 12, a portion that needs to be reprinted due to the occurrence of a trouble is not cut out, and reprinting is performed in accordance with the position of the trouble occurrence portion. That is to say, the processing in FIG. 12 is performed in the case where the cutting of the trouble occurrence portion is not detected in step S701 in FIG. 7, the processing proceeds to step S704, it is then determined that the trouble occurrence portion is to be reprinted, and it is determined in step S1002 that the trouble occurrence portion has not been cut out.

Initially, in step S1201, it is determined whether or not the number of printing apparatuses used in printing by the suspended print job is one. Here, the case where the number of printing apparatuses used in printing is not one is, for example, a case where the front face is printed by the first printing apparatus 119 and the back face is printed by the second printing apparatus 120, or a case where the second printing apparatus 120 performs printing over an image printed by the first printing apparatus 119. If it is determined that the number of printing apparatuses used in printing is one, the processing proceeds to step S1202. If the number of apparatuses used in printing is one, an image that has been normally printed by this single printing apparatus will serve as a normal finished product as-is. This is because printing does not need to be further performed by other printing apparatuses. An image in the process of being printed is not used as a finished product. On the other hand, if it is determined in step S1201 that the number of printing apparatuses used in printing is not one, the processing proceeds to step S1203.

In step S1202, the printing medium is sent to a position where printing can be restarted. Here, the position where printing can be restarted is, for example, a position where an image to be printed when restarting printing is separated from the previous image by a necessary blank. That is to say, it is a position up to which the printing medium is moved by a necessary blank for starting reprinting from behind the image in the process of being printed at the time of the occurrence of the trouble. The image in the process of being printed at the time of the occurrence of the trouble is specified based on the information in the printing information table that is created and updated in the flow in FIG. 6. The specified content includes image identification information and the length of already-printed images. After step S1202, the processing proceeds to step S1211.

On the other hand, in step S1203, it is determined whether or not the length by which the printing medium is sent to the position where printing can be restarted in a first-time printing apparatus is smaller than the largest value of the remaining length of the images in the process of being printed in second-time and subsequent printing apparatuses. Here, the first-time printing apparatus refers to a printing apparatus existing closest to the paper feeding side among the printing apparatuses used in printing in the entire printing system. The second-time and subsequent printing apparatuses refer to printing apparatuses existing closer to the paper discharging side than the first-time printing apparatus, among the printing apparatuses used in printing in the entire printing system. For example, the second-time printing apparatus refers to the printing apparatus that performs printing immediately after the first-time printing apparatus, and exists closer to the paper discharging side than the first-time printing apparatus.

For example, consider a printing system including two printing apparatuses, namely the first printing apparatus 199 and the second printing apparatus 120 as shown in FIG. 1. At this time, if only the second printing apparatus 120 is used in printing, the first-time printing apparatus is the second printing apparatus 120. If both the first printing apparatus 119 and the second printing apparatus 120 are used in printing, the first-time printing apparatus is the first printing apparatus 119, and the second-time printing apparatus is the second printing apparatus 120.

In another example, consider the case where three printing apparatuses are used in printing in a printing system including four printing apparatuses. In this case, the printing system includes a first printing apparatus, a second printing apparatus, a third printing apparatus, and a fourth printing apparatus, in order from the printing apparatus existing closest to the paper feeding side. It is also assumed that the first, third, and fourth printing apparatuses are used in printing. In this case, the first printing apparatus is the first-time printing apparatus, the third printing apparatus is the second-time printing apparatus, and the fourth printing apparatus is the third-time printing apparatus. In this manner, the first-time printing apparatus and the second-time and subsequent printing apparatuses are the printing apparatus used in printing among a plurality of printing apparatuses, and they are given sequential numbers, such as the "first-time" and the "second-time". However, these numbers do not necessarily coincide with the numbers for identifying individual printing apparatuses (e.g., "first" in the first printing apparatus). Furthermore, regarding the remaining length of an image in the process of being printed, for example, in the case where an image having a length of 100 mm in the conveyance direction is in the process of being printed up to 40 mm from its head portion, the remaining length of this image is 60 mm.

If it is determined, according to a result of the determination in step S1203, that the length by which the printing medium is sent to the position where printing can be restarted in the first-time printing apparatus is smaller than the largest value of the remaining length of the images in the process of being printed in the second-time and subsequent printing apparatuses, the processing proceeds to step S1204, and if it is determined that the length is not smaller, the processing proceeds to step S1205. In step S1204, the sheet starts to be conveyed to a start position of an image subsequent to the image in the process of being printed having the largest value in step S1203. This is because there are cases where, for example, the images in the process of being printed in the second-time and subsequent printing apparatuses are images to be printed on the back face of images that have already been printed in the first-time printing apparatus, or are images to be printed so as to overlap the already-printed images. That is to say, the sheet is conveyed to the position where the next image is started. On the other hand, in step S1205, as in step S1202, the sheet starts to be conveyed to the position where printing can be restarted in the first-time printing apparatus.

The reason why step S1204 or S1205 is performed based on a determination result in step S1203 will now be described. In all printing apparatuses, images in the process of being printed at the point in time of the occurrence of a trouble are discarded. For this reason, when printing is restarted, the image in the process of being printed and to be discarded needs to be moved from below the printing heads of each printing apparatus. This is because, if printing is restarted without any blank after the image in the process of being printed and to be discarded, the image printed after restarting printing will not serve as a finished product. For this reason, the printing medium is conveyed for a necessary blank after the image in the process of being printed, thus conveying the sheet to the position where printing can be restarted.

Here, if there are a plurality of printing apparatuses used in printing of a print job, it means that there are also a plurality of images in the process of being printed. In this case, when the image in the process of being printed below the printing heads in a certain printing apparatus is moved to the position where printing can be restarted, consideration needs to be given such that printing can also be restarted with the printing heads of other printing apparatuses. For this reason, the determination in step S1203 is performed in the present embodiment. First, the length by which the printing medium is sent to the position where printing can be restarted in the first-time printing apparatus is the length for conveying the printing medium for a necessary blank after the image in the process of being printed in the first-time printing apparatus. In the first-time printing apparatus, printing is not performed over an already-printed image. Accordingly, in the first-time printing apparatus, only the movement for a necessary blank after the image in the process of being printed needs to be considered regarding sheet conveyance for restarting printing.

Next, the largest value of the remaining length of the images in the process of being printed in the second-time and subsequent printing apparatuses refers to the largest of the lengths by which the sheet is conveyed to the position where printing can be restarted in the second-time and subsequent printing apparatuses. For example, if the sheet needs to be further conveyed by 500 mm and 600 mm respectively in the second-time printing apparatus and the third-time printing apparatus in order to restart printing, the necessary sheet conveyance length of 600 mm in the third printing apparatus that is the largest value between 500 mm and 600 mm is selected. Then the necessary sheet conveyance length in the first-time printing apparatus is compared with the necessary sheet conveyance lengths in the second-time and subsequent printing apparatuses, and conveyance is performed in accordance with the conveyance length having a larger value. At the time of this conveyance, in the printing apparatus whose necessary conveyance length for restarting printing is not the largest value, the position where printing can be restarted reaches below the printing heads during sheet conveyance. The operation in this case will be described in step S1206.

Note that the printing medium is conveyed in steps S1204 and S1205, and since the printing medium is continuous among the printing apparatuses, the printing medium moves in all printing apparatuses when the printing medium is sent in steps S1204 and S1205. For example, if the printing medium is sent to a position where printing can be restarted in the first-time printing apparatus, the sheet is conveyed in accordance with the first-time printing apparatus, while the printing medium also moves in the second-time and subsequent printing apparatuses together with this sheet conveyance.

Next, in step S1206, it is determined whether or not printing can be performed in the printing apparatuses other than the printing apparatus that is the subject in step S1204 or S1205 during sheet conveyance started in step S1204 or S1205. The printing apparatuses other than the printing apparatus that is the subject in step S1204 or S1205 refer to, in step S1204, printing apparatuses that are among the second-time and subsequent printing apparatuses and are other than the printing apparatus that has printed the image in the process of being printed having the largest remaining length. In step S1205, they refer to the printing apparatuses other than the first-time printing apparatus.

If it is determined in step S1206 that printing cannot be performed, the processing proceeds to step S1208, and if it is determined that printing can be performed, the processing proceeds to step S1207 to perform printing. The case where it is determined that printing can be performed is, for example, a case where the processing proceeds to step S1205 according to a determination result in step S1203, and the printing medium whose front face has already been printed is sent to a position where printing can be performed in the second-time printing apparatus while the sheet is being conveyed to a position where printing can be restarted in the first-time printing apparatus. If printing can be thus performed, the sheet is conveyed while the back face thereof is printed by the second printing apparatus.

Next, in step S1208, a reprinting interruption method is selected. Here, if the mode 1 (reprinting is given the highest priority) is selected, the processing proceeds to step S1209, and if the mode (reprinting is performed at the end of the overall printing) is selected, the processing proceeds to step S1210. In step S1209, a print job is transmitted for performing reprinting in the first-time printing apparatus while performing printing on the printing medium that can be printed in the second-time and subsequent printing apparatuses, and the processing proceeds to step S1211.

In step S1210, a print job is transmitted for restarting printing of images other than the image that needs to be reprinted in the first-time and subsequent printing apparatuses and then performing the reprinting after all of the restarted printing ends, and the processing proceeds to step S1211. In step S1211, printing restart/reprinting processing is started. The details of step S1211 are the processing in FIG. 11.

In the present embodiment, it is determined in step S1201 whether or not the number of printing apparatuses used in printing is one. Here, the case where the number of printing apparatuses used in printing is one includes both a case where only a single printing apparatus is used in a printing system having a plurality of printing apparatuses, such as a tandem system, and a case where the overall printing system has a single printing apparatus, for example. Regarding the case where the number of printing apparatuses used in printing is not one, the present embodiment has described an example of the printing system including two printing apparatuses as in FIG. 1 and an example of a printing system including four printing apparatuses. However, the method described in the present embodiment is also applicable to a case where the number of printing apparatuses is different from that in these examples, and the number of printing apparatuses is not particularly limited. Furthermore, although the present embodiment has described the flow in which reprinting is performed without cutting out the trouble occurrence portion, this does not apply to the case where printing is suspended for a reason other than the occurrence of a trouble and some images need to be reprinted.

According to the present embodiment, if printing processing is suspended and reprinting becomes thereby necessary, a portion that needs to be reprinted can be specified and a reprint job can be automatically generated, using the printing information table, without the need for an image identification mark or the like for specifying already-printed images. Furthermore, a portion that needs to be reprinted can be reprinted without cutting out the printing medium affected by the occurrence of a trouble, and at this time, reprinting can be performed while the printing medium affected by the occurrence of a trouble is not treated as a finished product.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-257393, filed Dec. 12, 2013, which is hereby incorporated by reference herein in its entirety.

What is claimed is:

1. A controlling apparatus for controlling a first printing apparatus that prints an image on a continuous sheet in a printing system including the first printing apparatus and a second printing apparatus that prints on the continuous sheet that is printed by the first printing apparatus on a downstream side in a conveyance direction of the continuous sheet, the controlling apparatus comprising:
   an updating unit configured to update, while printing on the continuous sheet, printing information containing execution information with which a printing state on the continuous sheet in the first printing apparatus can be specified;
   a determination unit configured to determine whether an error has occurred in the printing system;
   a first acquisition unit configured to acquire, in a case where the first printing apparatus conveys the continuous sheet toward an upstream side in the conveyance direction of the continuous sheet from a cut-out portion after the determination unit determines that the error has occurred and the continuous sheet is cut out between the first printing apparatus and the second printing apparatus, a first conveyance amount of the first printing apparatus after the continuous sheet is cut out;
   a second acquisition unit configured to acquire, in a case where the second printing apparatus conveys the continuous sheet toward the downstream side in the conveyance direction of the continuous sheet from the cut-out portion after the determination unit determines that the error has occurred and the continuous sheet is cut out between the first printing apparatus and the second printing apparatus, a second conveyance amount of the second printing apparatus after the continuous sheet is cut out;
   a first specification unit configured to specify, in a case where it is determined by the determination unit that the error has occurred in the printing system, an error occurrence position on the continuous sheet that has been printed by the first printing apparatus, based on a feeding amount of the continuous sheet from the first printing apparatus, the first conveyance amount acquired by the first acquisition unit and the second conveyance amount acquired by the second acquisition unit; and a second specification unit configured to specify an image printed on the error occurrence position, based on the error occurrence position specified by the first specification unit and the execution information updated by the updating unit.

2. The controlling apparatus according to claim 1, wherein the determination unit further determines that the error is solved in a case where the continuous sheet is cut out between the first printing apparatus and the second printing apparatus after the error has occurred.

3. The controlling apparatus according to claim 2, wherein the determination unit further determines whether the continuous sheet is cut out, based on a user operation.

4. The controlling apparatus according to claim 1, further comprising a suspension unit configured to suspend conveyance of the continuous sheet in a case where it is determined by the determination unit that the error has occurred in the printing system.

5. The controlling apparatus according to claim 1, further comprising an order determination unit configured to determine a printing order of the image printed on the error occurrence position.

6. The controlling apparatus according to claim 5, wherein the order determination unit determines the printing order such that the image printed on the error occurrence position is printed after printing of subsequent images to the image printed on the error occurrence position is finished.

7. The controlling apparatus according to claim 1, the first specification unit specifies a starting point and an end point of an error occurrence portion as the error occurrence position.

8. The controlling apparatus according to claim 1, further comprising a print control unit configured to cause the first printing apparatus to print an image on the continuous sheet so as to reprint the image printed on the error occurrence position, based on the image printed on the error occurrence position specified by the second specification unit.

9. The controlling apparatus according to claim 8, wherein the print control unit further performs control such that the second printing apparatus performs printing while conveying the continuous sheet toward the downstream side in the conveyance direction of the continuous sheet from the cut-out portion.

10. The controlling apparatus according to claim 8, further comprising a comparison unit configured to compare a third conveyance amount of the continuous sheet up to a printing restart position of an image in the first printing apparatus with a fourth conveyance amount of the continuous sheet up to a print end position of an image in the second printing apparatus, in a case where the continuous sheet is not cut out when the determination unit determines that the error has occurred, wherein in a case where the third conveyance amount is smaller than the fourth conveyance amount according to a result of comparison by the comparison unit, the print control unit further causes the second printing apparatus to convey the continuous sheet up to a print start position of an image subsequent to an image whose printing is interrupted.

11. The controlling apparatus according to claim 8, wherein the print control unit further causes the second printing apparatus to print an image on a region other than the error occurrence position of the continuous sheet on which printing has been finished by the first printing apparatus before it is determined by the determination unit that the error has occurred, based on a starting point and an end point of an error occurrence portion as the error occurrence position.

12. The controlling apparatus according to claim 8, wherein the print control unit causes the first printing apparatus to reprint the image printed on the error occurrence position after printing is restarted.

13. The controlling apparatus according to claim 8, wherein the print control unit causes the first printing apparatus to reprint the image printed on the error occurrence position after printing subsequent images to the image printed on the error occurrence position.

14. The controlling apparatus according to claim 8, wherein the print control unit causes the first printing apparatus to reprint all images printed by the first printing apparatus, wherein the all images include the image printed on the error occurrence position.

15. The controlling apparatus according to claim 1, wherein the execution information is information for specifying an image which has been printed on the continuous sheet, and specifying a total length, in the conveyance direction of the continuous sheet, from a sheet feed start position to a position of the image which has been printed on the continuous sheet.

16. The controlling apparatus according to claim 15, wherein the execution information includes starting information indicating whether each printing operation has started, and finishing information indicating whether each printing operation has finished.

17. The controlling apparatus according to claim 16, wherein the execution information further includes a total length corresponding to each printing operation.

18. The controlling apparatus according to claim 16, wherein each printing operations includes a printing operation which is based on a print job and a printing operation which is not based on a print job.

19. The controlling apparatus according to claim 18, wherein the printing operation which is not based on the print job includes at least one of a preliminary discharging, a cut mark printing, a blank inserting.

20. The controlling apparatus according to claim 15, wherein the execution information includes a length of each image in the conveyance direction of the continuous sheet.

21. The controlling apparatus according to claim 1, wherein the first conveyance amount and the second conveyance amount are obtained from a cut-out edge of the continuous sheet, wherein the cut-out edge is detected to be a same sheet width as a sheet width unique to the continuous sheet.

22. The controlling apparatus according to claim 1, wherein the error includes at least one of a paper jam, a non-discharge of ink, an unexpected stop of the printing system.

23. A control method to be executed in controlling apparatus for controlling a first printing apparatus that prints an image on a continuous sheet in a printing system including the first printing apparatus and a second printing apparatus that prints on the continuous sheet that is printed by the first printing apparatus on a downstream side in a conveyance direction of the continuous sheet, the method comprising:

updating, while printing on the continuous sheet, printing information containing execution information with which a printing state on the continuous sheet in the first printing apparatus can be specified;

determining whether an error has occurred in the printing system;

a first acquisition step of acquiring, in a case where the first printing apparatus conveys the continuous sheet toward an upstream side in the conveyance direction of the continuous sheet from a cut-out portion after it is determined that the error has occurred and the continuous sheet is cut out between the first printing apparatus and the second printing apparatus, a first conveyance amount of the first printing apparatus after the continuous sheet is cut out;

a second acquisition step of acquiring, in a case where the second printing apparatus conveys the continuous sheet toward the downstream side in the conveyance direction of the continuous sheet from the cut-out portion after it is determined that the error has occurred and the continuous sheet is cut out between the first printing apparatus and the second printing apparatus, a second conveyance amount of the second printing apparatus after the continuous sheet is cut out;

specifying, in a case where it is determined that the error has occurred in the printing system, an error occurrence position on the continuous sheet that has been printed by the first printing apparatus, based on a feeding amount of the continuous sheet from the first printing apparatus, the first conveyance amount acquired by the first acquisition step and the second conveyance amount acquired by the second acquisition step, and a second specification step of specifying an image printed on the error occurrence position, based on the error occurrence position first specified and the execution information updated by the updating step.

24. A non-transitory computer-readable printing medium storing a program for causing a computer to execute a control method to be executed in controlling apparatus for controlling a first printing apparatus that prints an image on a continuous sheet in a printing system including the first printing apparatus and a second printing apparatus that prints on the continuous sheet that is printed by the first printing apparatus on a downstream side in a conveyance direction of the continuous sheet, the method comprising:

updating, while printing on the continuous sheet, printing information containing execution information with which a printing state on the continuous sheet in the first printing apparatus can be specified;

determining whether an error has occurred in the printing system;

a first acquisition step of acquiring, in a case where the first printing apparatus conveys the continuous sheet toward an upstream side in the conveyance direction of the continuous sheet from a cut-out portion after it is determined that the error has occurred and the continuous sheet is cut out between the first printing apparatus and the second printing apparatus, a first conveyance amount of the first printing apparatus after the continuous sheet is cut out;

a second acquisition step of acquiring, in a case where the second printing apparatus conveys the continuous sheet toward the downstream side in the conveyance direction of the continuous sheet from the cut-out portion after it is determined that the error has occurred and the continuous sheet is cut out between the first printing apparatus and the second printing apparatus, a second conveyance amount of the second printing apparatus after the continuous sheet is cut out;

specifying, in a case where it is determined that the error has occurred in the printing system, an error occurrence position on the continuous sheet that has been printed by the first printing apparatus, based on a feeding amount of the continuous sheet from the first printing apparatus, the first conveyance amount acquired by the first acquisition step and the second conveyance amount acquired by the second acquisition step, and a second specification step of specifying an image printed on the error occurrence position, based on the error occurrence position first specified and the execution information updated by the updating step.

* * * * *